US012615288B2

(12) United States Patent
Liu et al.

(10) Patent No.: US 12,615,288 B2
(45) Date of Patent: Apr. 28, 2026

(54) SECURE RADIO FREQUENCY SENSING WAVEFORM CONFIGURATIONS

(71) Applicant: QUALCOMM Incorporated, San Diego, CA (US)

(72) Inventors: Kangqi Liu, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/588,715

(22) Filed: Feb. 27, 2024

(65) Prior Publication Data

US 2025/0274487 A1     Aug. 28, 2025

(51) Int. Cl.
    *H04L 9/40*        (2022.01)
    *H04L 9/06*        (2006.01)
    *H04W 12/102*     (2021.01)

(52) U.S. Cl.
    CPC ............ *H04L 63/1466* (2013.01); *H04L 9/06* (2013.01); *H04W 12/102* (2021.01)

(58) Field of Classification Search
    CPC ..... H04L 63/1466; H04L 9/06; H04W 12/012
    USPC ......................................................... 726/22
    See application file for complete search history.

(56) References Cited

U.S. PATENT DOCUMENTS

2009/0184819 A1*  7/2009  Green .................. H04B 17/318
                                          455/226.2
2016/0098544 A1*  4/2016  Kim ................. H04N 21/44004
                                          380/203

2019/0288884 A1*  9/2019  Eroz ..................... H04L 1/0048
2024/0039928 A1*  2/2024  Gutman .............. H04W 12/122
2024/0106509 A1*  3/2024  Yao ................... H04L 1/0003
2024/0310469 A1*  9/2024  Singh ............... H04W 12/122
2024/0314566 A1*  9/2024  Singh ................... G01S 13/886
2025/0141658 A1*  5/2025  Reddy .................. H04W 12/03
2025/0208248 A1*  6/2025  Tang ........................ G01S 3/04

FOREIGN PATENT DOCUMENTS

CN       115442007 A     12/2022
KR       101339755 B1     1/2014
WO    2021253307 A1    12/2021

OTHER PUBLICATIONS

International Search Report and Written Opinion—PCT/US2025/013717—ISA/EPO—May 15, 2025.

* cited by examiner

*Primary Examiner* — Michael S McNally

(74) *Attorney, Agent, or Firm* — Sunstein LLP

(57)            ABSTRACT

Techniques are provided for generating secure radio frequency (RF) sensing waveforms to reduce the risk of a man-in-the-middle (MITM) attack for positioning, sensing and communications. An example method for transmitting a secure radio frequency sensing waveform includes transmitting a first set of parameters including timing information or frequency information associated with a radio frequency sensing waveform, transmitting the radio frequency sensing waveform, and transmitting a second set of parameters including scrambling information associated with the radio frequency sensing waveform.

34 Claims, 16 Drawing Sheets

250

270

LMF

272

SLP

260

5GC

266

264

AMF     SMF     UPF

262

265     265     263     263

220

NEW RAN

224 ng-eNB     gNB

Transmit and Receive

600

606 — Server

604 — gNB(s)

602 — UE

RF Sensing Scheme

608

607 — Capability message(s)

610 — 1st FMCW Configuration

612 — FMCW transmission(s)

616 — 2nd FMCW Configuration

614 — Partial processing and storage

620 — Descramble FMCW

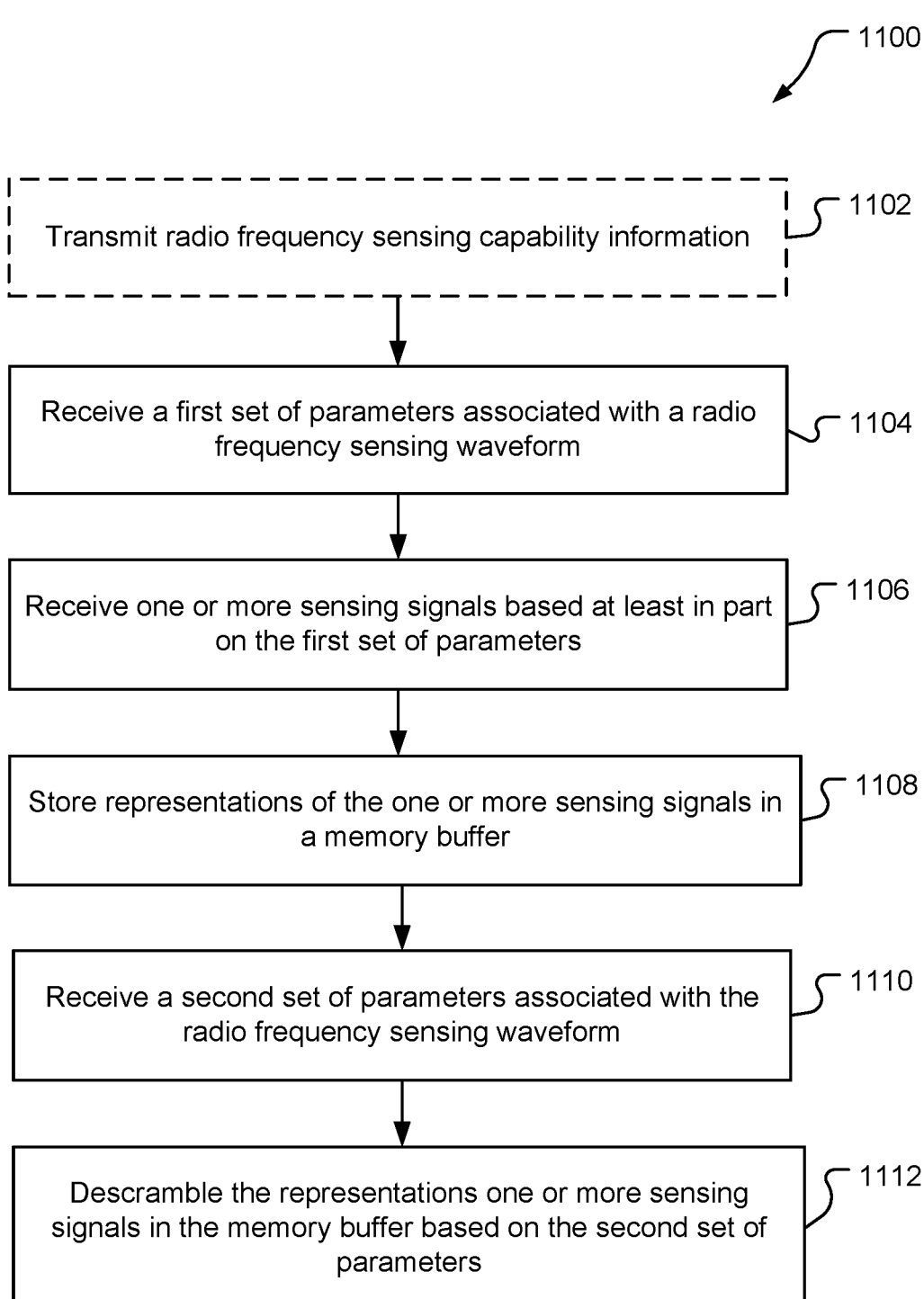

1100

1102
Transmit radio frequency sensing capability information

1104
Receive a first set of parameters associated with a radio frequency sensing waveform 1106
Receive one or more sensing signals based at least in part on the first set of parameters 1108
Store representations of the one or more sensing signals in a memory buffer 1110
Receive a second set of parameters associated with the radio frequency sensing waveform 1112
Descramble the representations one or more sensing signals in the memory buffer based on the second set of parameters

FIG. 11

SECURE RADIO FREQUENCY SENSING WAVEFORM CONFIGURATIONS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of RF signals for wireless communication between network nodes, such as base stations, user equipment (UEs), vehicles, factory automation machinery, and the like. The RF signals may also be used for RF sensing applications such as autonomous driving, intruder detection, gesture recognition, beam management, and other macro and micro sensing applications. In some applications, the RF sensing signals may be spoofed or interfered with to the detriment of a user. For example, RF sensing and communication signals may be vulnerable to man-in-the-middle type attacks where a third party may attempt to intercept or otherwise disrupt RF sensing operations.

SUMMARY

An example method for transmitting a secure radio frequency sensing waveform according to the disclosure includes transmitting a first set of parameters including timing information or frequency information associated with a radio frequency sensing waveform, transmitting the radio frequency sensing waveform, and transmitting a second set of parameters including scrambling information associated with the radio frequency sensing waveform.

An example method for receiving a secure radio frequency sensing waveform according to the disclosure includes receiving a first set of parameters associated with a radio frequency sensing waveform, receiving one or more sensing signals based at least in part on the first set of parameters, storing representations of the one or more sensing signals in a memory buffer, receiving a second set of parameters associated with the radio frequency sensing waveform, and descrambling the representations of the one or more sensing signals in the memory buffer based on the second set of parameters.

An example apparatus according to the disclosure includes at least one memory, at least one transceiver, at least one processor communicatively coupled to the at least one memory and the at least one transceiver, and configured to: transmit a first set of parameters including timing information or frequency information associated with a radio frequency sensing waveform; transmit the radio frequency sensing waveform; and transmit a second set of parameters including scrambling information associated with the radio frequency sensing waveform.

An example apparatus according to the disclosure includes at least one memory, at least one transceiver, at least one processor communicatively coupled to the at least one memory and the at least one transceiver, and configured to: receive a first set of parameters associated with a radio frequency sensing waveform; receive one or more sensing signals based at least in part on the first set of parameters; store representations of the one or more sensing signals in a memory buffer; receive a second set of parameters associated with the radio frequency sensing waveform; and descramble the representations of the one or more sensing signals in the memory buffer based on the second set of parameters.

Items and/or techniques described herein may provide one or more of the following capabilities, as well as other capabilities not mentioned. A wireless node may be capable of transmitting and/or receiving radio frequency (RF) sensing signals. The RF sensing signals may be utilized for sensing, positioning, and/or communication operations. A network resource, such as a base station, may provide a first set of parameters associated with a RF sensing waveform to the wireless node. The wireless node may utilize the first set of parameters to receive and store at least a portion of a RF sensing signal transmitted by a base station or other wireless node in a wireless network. The RF sensing signal may be scrambled. The network resource may subsequently provide a second set of parameters to the wireless node. The wireless node may utilize the second set of parameters to descramble the previously received RF sensing signal. The threat of man-in-the-middle (MITM) attacks on the RF sensing signal may be reduced. Other capabilities may be provided and not every implementation according to the disclosure must provide any, let alone all, of the capabilities discussed.

BRIEF DESCRIPTION OF THE DRAWINGS

FIGS. 2A and 2B illustrate example wireless network structures.

FIGS. 3A to 3C are simplified block diagrams of several sample components that may be employed in wireless communication nodes and configured to support communication and radio frequency sensing.

FIG. 11 is an example process flow diagram of a method for receiving a secure RF sensing waveform.

DETAILED DESCRIPTION

Figure 1:
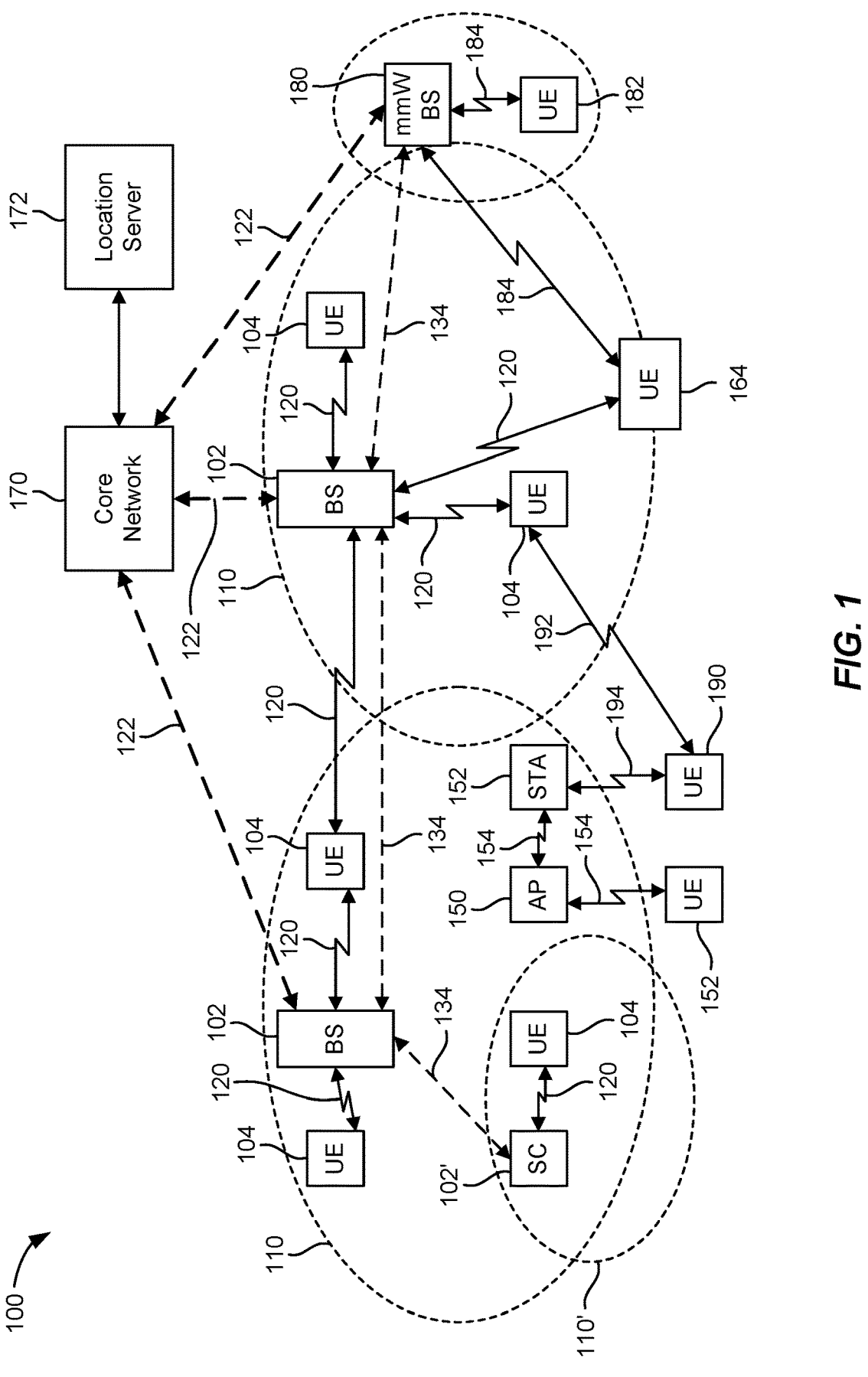
FIG. 1 illustrates an example wireless communications system.

Techniques are provided herein for generating secure RF sensing waveforms. In an example, a secure RF sensing waveform may be a frequency modulated continuous wave (FMCW) signal configured to reduce the risk of a man-in-the-middle (MITM) attack for positioning, sensing and communications. In cryptography and computer security, a MITM attack is typically a cyberattack where an attacker secretly relays and possibly alters the communications between two parties who believe that they are directly communicating with each other, and the attacker inserts themselves between the two parties. One example of a MITM attack is active eavesdropping, in which the attacker attempts to make independent connections with the victims and then relay messages between the victims in an effort to make the victims believe they are directly communicating with one another over a private connection. In reality, however, the communications between the victims is being controlled by the attacker.

Such eavesdropping attacks are possible when the attacker intercepts relevant messages passing between the two victims and then injects new messages. This may be a straightforward process in many use cases. For example, an attacker within the reception range of an unencrypted Wi-Fi access point may insert themselves as a man-in-the-middle with the intent of circumventing mutual authentication. Such a MITM attack may succeed when the attacker impersonates each endpoint with sufficient detail to meet the security requirements. To help prevent such eavesdropping attacks, many cryptographic protocols include some form of endpoint authentication. For example, Transport Layer Security (TLS) protocols may enable authentication of one or both parties using a mutually trusted certificate authority.

The secure RF sensing waveform configurations described herein may utilize scrambled RF sensing waveforms to enable secure positioning, sensing and communications. In an example, the scrambled RF sensing waveforms may be scrambled FMCW signals. Generally, FMCW may be utilized in radar systems based on the relatively lower complexity and costs as compared to other waveforms. Such radar systems may be used for multiple purposes such as RF sensing, positioning, communications, and joint communications and sensing (JCS) operations. During RF sensing operations, the coexistence of multiple radars in congested traffic may cause operational issues (e.g., decreased detection performance due to increasing numbers of radar-equipped vehicles on the roads). The interference caused by other radars may negatively impact the sensing functionality of the receiver by decreasing their detection capability. During communications and/or positioning operations, the receiver may be unable to detect device identification information when receiving an un-coded FMCW signal. For example, the detection of a user equipment ID (UE ID) (e.g., in an uplink use case) or a cell ID (e.g., in a downlink use case) may be missed. The received FMCW may also be interfered with by other FMCW transmitters.

The techniques provided herein may overcome MITM attacks in RF sensing, positioning and communication operations. In an example, a mobile device, such as a user equipment (UE), may receive FMCW configuration information from a network resource such as a base station (e.g., gNB) or a networked server, and then receive a FMCW waveform for sensing, positioning or communications. To reduce the risks of a MITM attack, the FMCW configuration information may be separated into different transmissions which will occur before and after the transmission of the FMCW waveform. The FMCW configuration information will maintain the narrowband baseband requirement for the UE to process the FMCW and may include scrambling information to confuse a potential MITM attack. The scrambling for each FMCW transmission may be different to prevent an attacker from anticipating a scrambling configuration.

In operation, in an example, a first transmission received from the network may include a first set of parameters associated with a FMCW waveform. For example, the first set of parameters may include one or more of the frequency domain resource allocation (FDRA) information for the FMCW waveform (e.g., the start frequency of the FMCW, the end frequency of the FMCW, etc.), the time domain resource allocation (TDRA) information for the FMCW waveform (e.g., the start timing of the FMCW, the end timing of the FMCW, etc.), the slope of the FMCW, and the repetition times of the FMCW. Other information to enable the narrowband processing of the FMCW waveform may also be included in the first set of parameters. A second transmission including a second set of parameters associated with the FMCW waveform may be received after the FMCW waveform is transmitted. In an example, the second set of parameters may include a method of scrambling (e.g., frequency-domain scrambling, time-domain scrambling, etc.), a scrambling length (e.g., the number of scrambling bits, etc.), a scrambling ID, a modulation method of the scrambling ID (e.g., BPSK, PI/2 BPSK, QPSK, etc.), an indication of a rolling of method for the scrambling sequence (e.g., raised-cosine filter, Gaussian low-pass filter, etc.), and comb pattern information. Other information to enable the UE to descramble the FMCW waveform may be included in the second set of parameters.

The UE may be configured to utilize the first set of parameters to receive and process a RF-wideband FMCW into a BB-narrowband signals and store the narrowband (NB) signals in a buffer (e.g., memory). The UE may then utilize the second set of parameters to descramble the received and scrambled FMCW signal for further processing, such as for RF sensing, positioning and/or communication operations. In an example, the scrambling sequences may not be correlated with a scrambling sequences of previous transmitted FMCW (e.g., within slot/frame).

Particular aspects of the subject matter described in the disclosure may be implemented to realize one or more of the following potential advantages. MITM attacks for FMCW transmissions may be prevented. The complexity and costs of RF sensing capable devices may be reduced. Network coordination of RF sensing, positioning and communication operations may be enhanced. Interference due to multiple FMCW signals in a device dense area may be reduced. These techniques and configurations are examples, and other techniques and configurations may be used.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "wireless node," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs). In general, a UE and a base station are examples of wireless nodes in a wireless network.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal. An FMCW signal is an example of a RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range.

Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
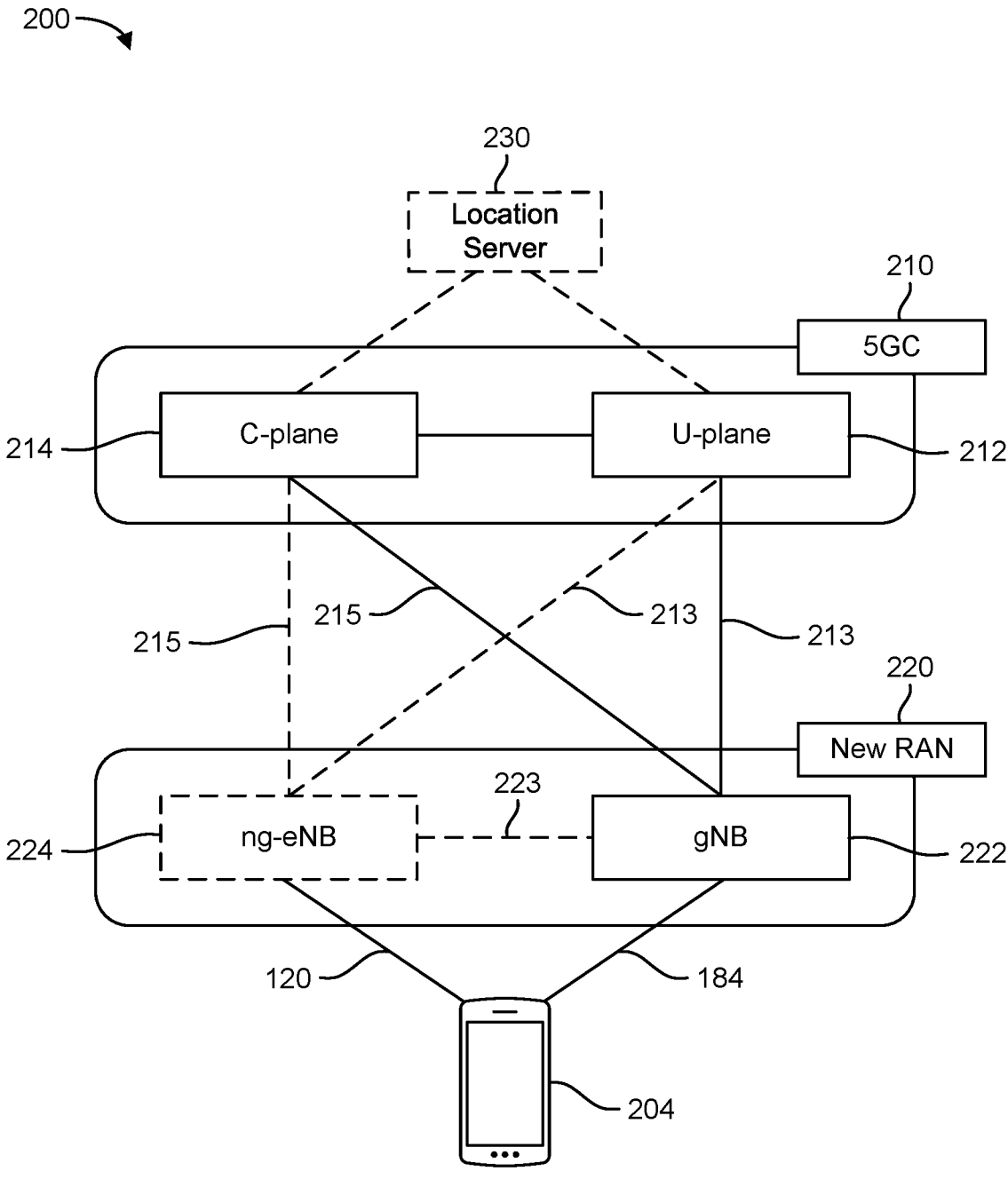

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
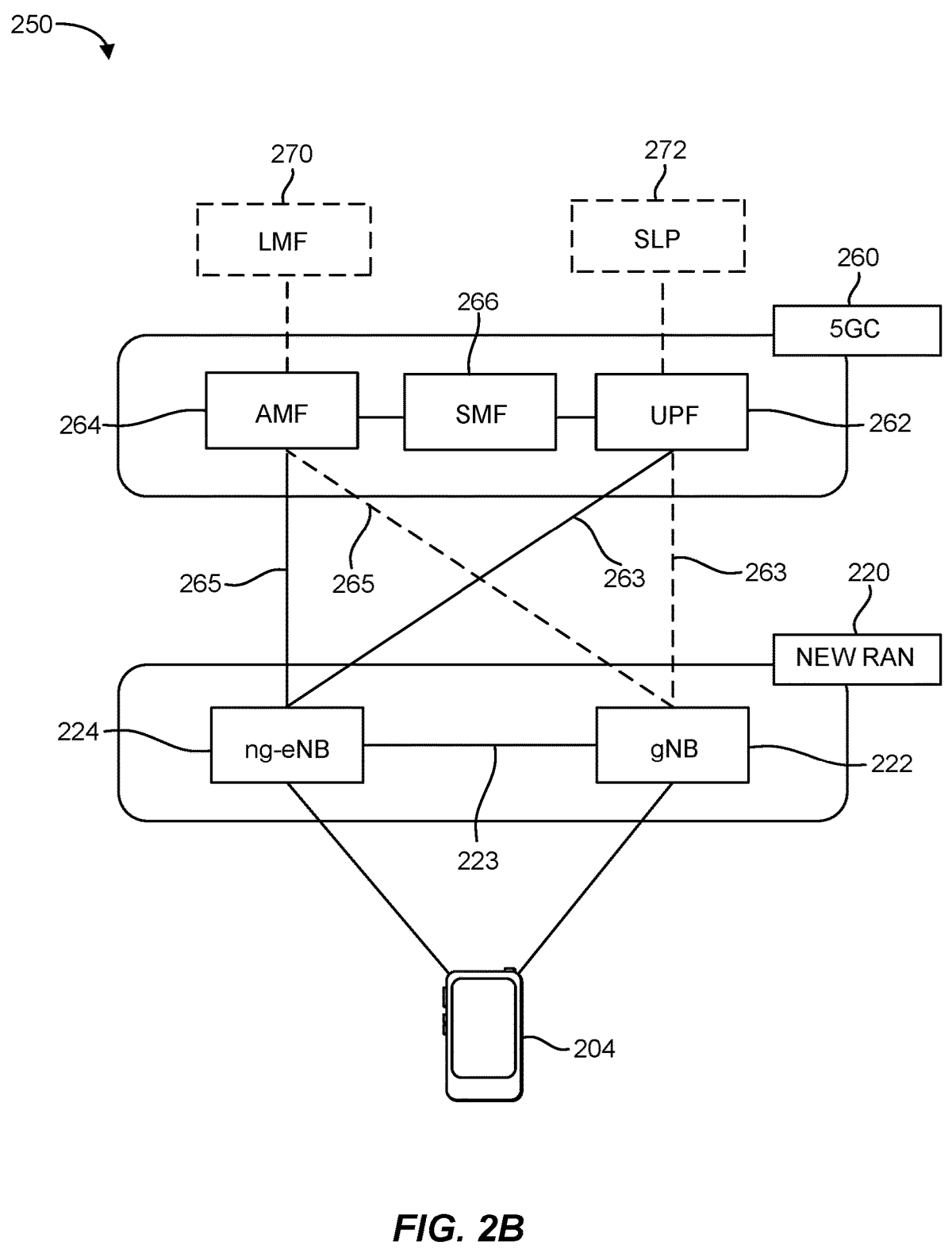

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
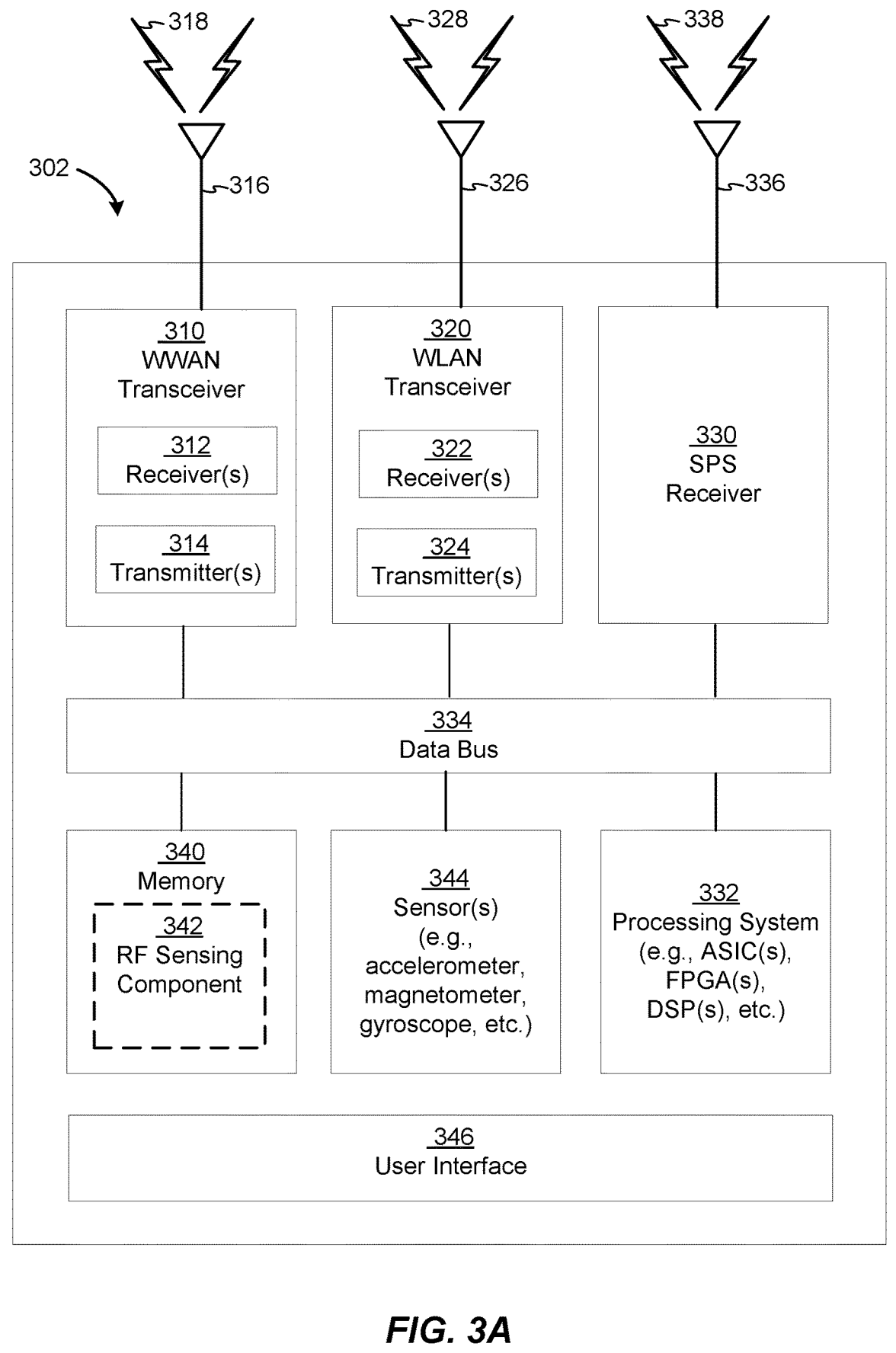
Figure 3B:
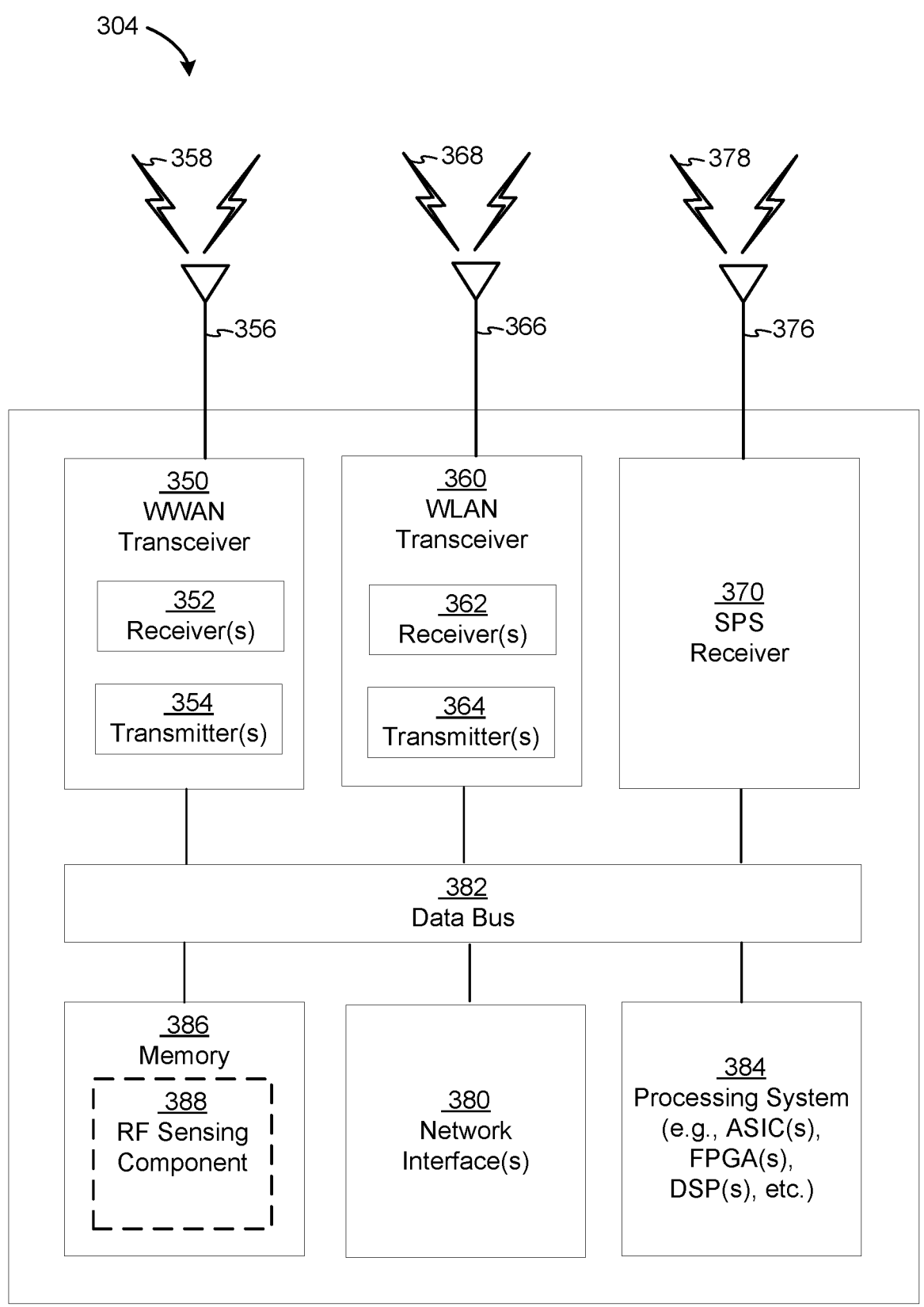
Figure 3C:
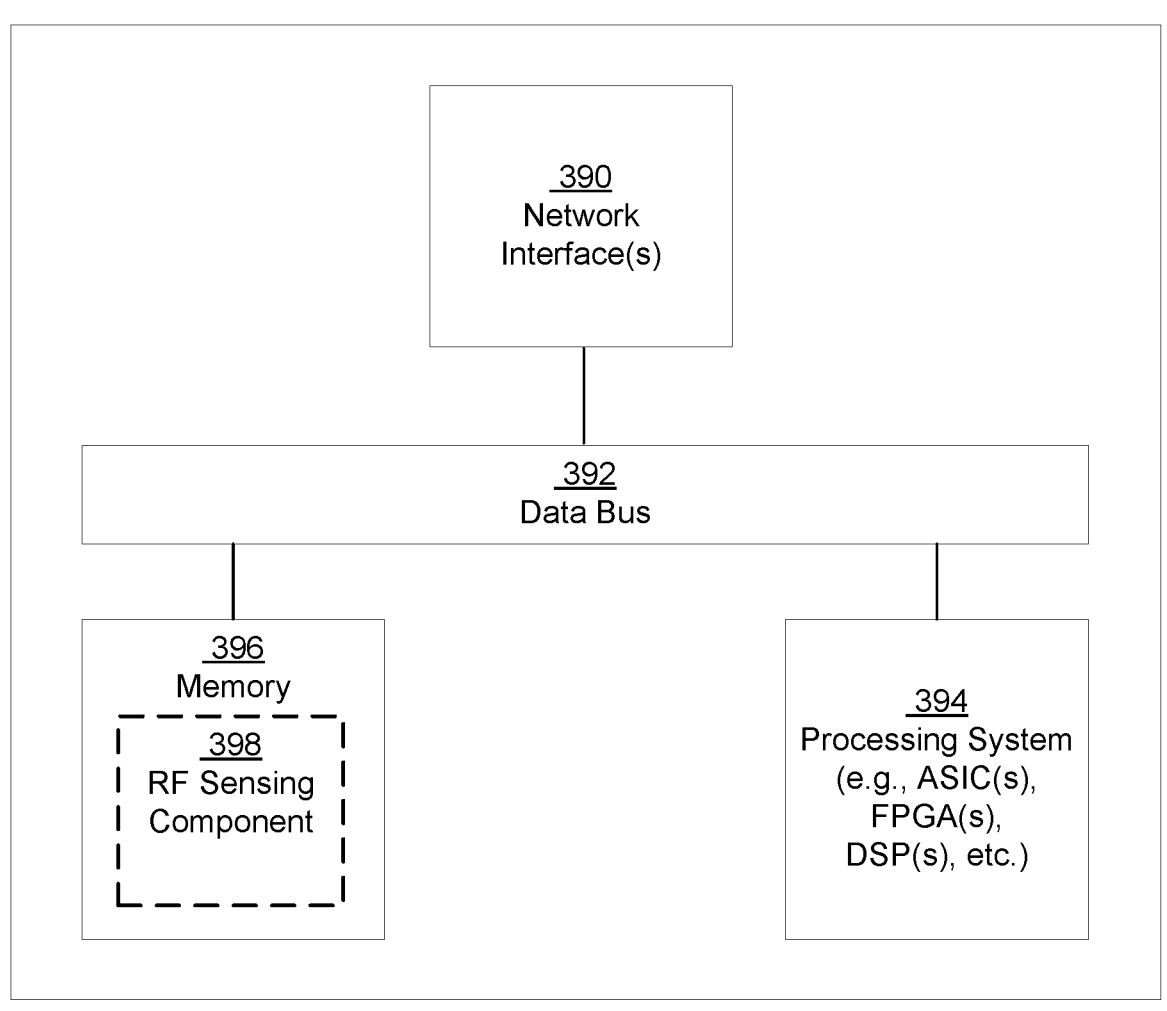

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, joint communication and RF sensing (i.e., integrated sensing and communications (ISAC) operations), and for providing other processing functionality. The base station 304 includes a processing system 384 for providing functionality relating to, for example, ISAC operations as disclosed herein, and for providing other processing functionality. The network entity 306 includes a processing system 394 for providing functionality relating to, for example, ISAC operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols, and FMCW signals) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform and/or a FMCW waveform as utilized in LTE and NR. High-frequency communication signals, such as mmW RF signals, are especially beneficial to use as radar signals because the higher frequency provides, at least, more accurate range (distance) detection.

Figure 4A:
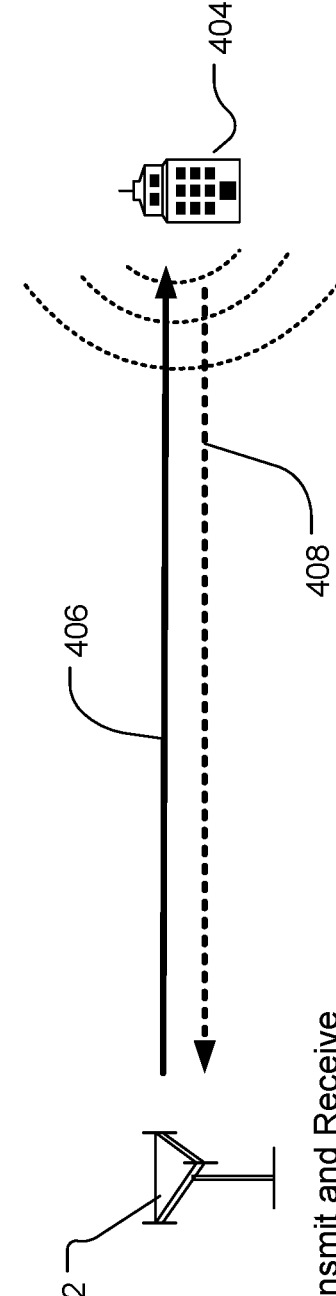
FIG. 4A illustrates an example monostatic RF sensing system.
Figure 4B:
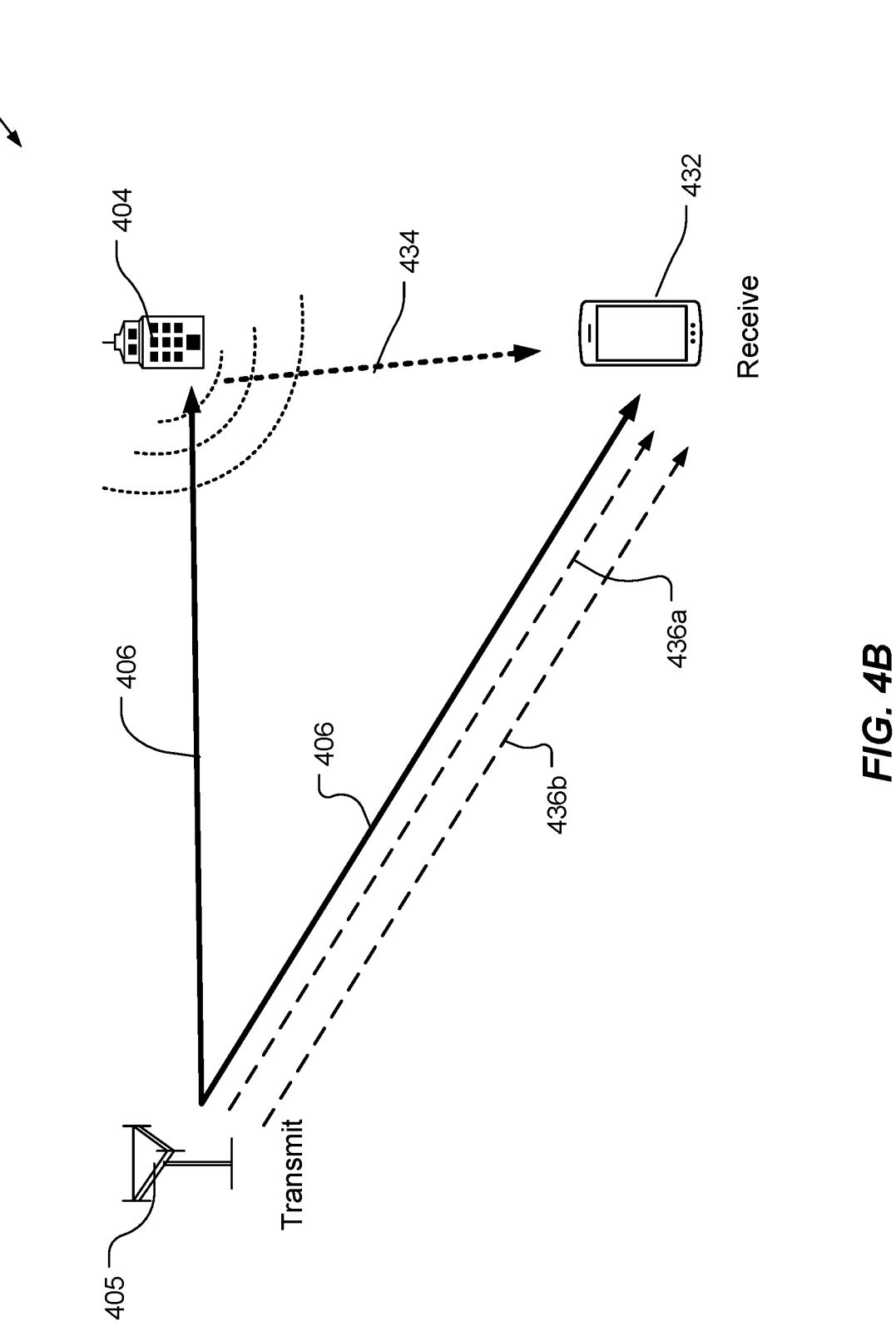
FIG. 4B illustrates an example bistatic RF sensing system.

In general, there are different types of RF sensing, and in particular, monostatic and bistatic (e.g., multistatic) RF sensing. FIGS. 4A and 4B illustrate two of these various types of RF sensing. Specifically, FIG. 4A is a diagram 400 illustrating a monostatic RF sensing scenario, and FIG. 4B is a diagram 430 illustrating a bistatic RF sensing scenario. The concepts of the bistatic RF sensing scenario in FIG. 4B may be extended to multiple stations for multistatic RF sensing. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, RF sensing. In an example, monostatic RF sensing may be realized with half duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., OFDM reference signals, FMCW signals, or other waveforms) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 may be configured to perform object detection based on the uplink RF signals just like the UE 432 does based on the downlink RF signals.

Figure 5:
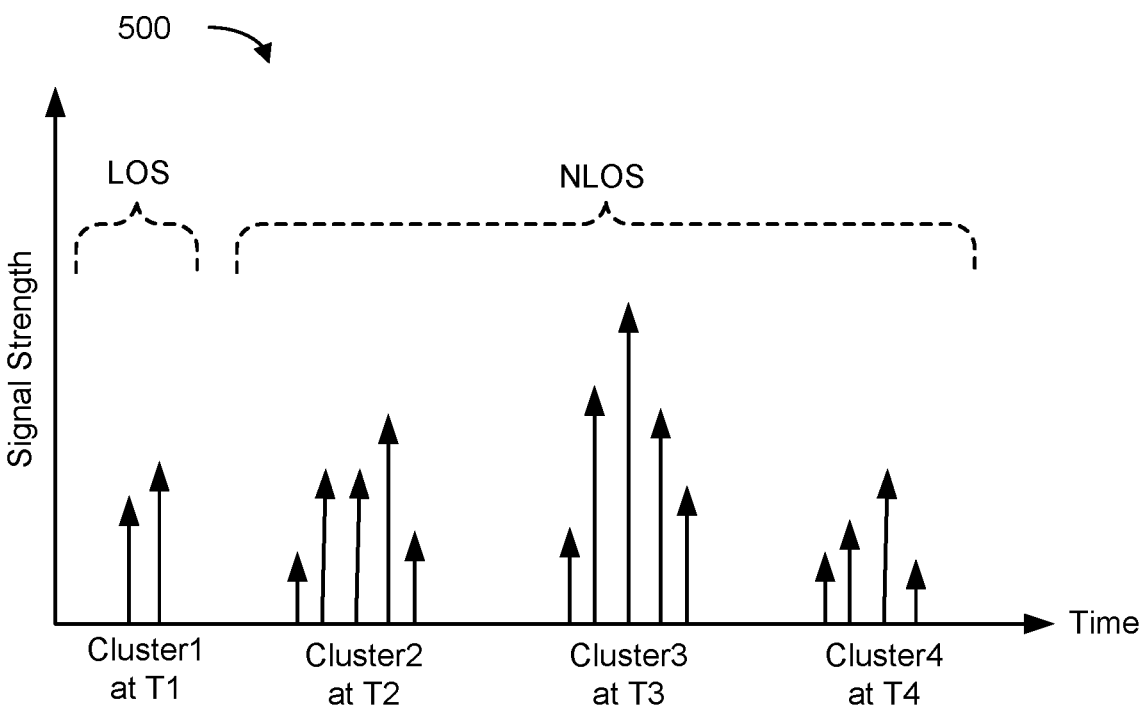
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

In an example, referring to FIG. 4B, the base station 405 may be configured to transmit additional signals to prevent MITM attacks associated with the RF signal 406 by sending FMCW configuration messages to the UE 432 before and after transmitting the RF signal 406. A first FMCW configuration message 436a may include a first set of parameters associated with the RF signal 406, such as frequency, timing, slope, and repetition information for FMCW pulses in the RF signal 406. The first FMCW configuration message 436a will enable the UE 432 to partially process the RF signal 406 to a narrowband (NB) signal and store the NB signal in a temporary buffer. The UE 432 will not be able to descramble the RF signal 406 until a second FMCW configuration message 436b is received. The second FMCW configuration message 436b may include scrambling information (e.g., method, length, ID, modulation, etc.) to enable the UE 432 to descramble the RF signal 406 for further processing. The further processing may include RF sensing, positioning and communication operations.

Figure 6:
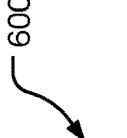
FIG. 6 is a example message flow diagram for configuring a secure RF sensing waveform.

Referring to FIG. 6, an example message flow 600 for configuring a secure RF sensing waveform is shown. The message flow 600 includes a UE 602, one or more gNB(s), such as the gNB 604, and a server 606. The UE 602 may have some or all of the components of the UE 302, and the UE 302 may be an example of the UE 602. The gNB 604 may have some or all of the components of the base station 304, and the base station 304 may be an example of the gNB 604. The server 606 may have some or all of the components of the network entity 306, and the network entity 306 may be an example of the server 606. The message flow 600 may utilize different communication layers (e.g., Layer-1, Layer-2, Layer-3) to send and receive RF signals. For example RRC layer functionality may be utilized to provide waveform configuration information. Other signaling and messaging techniques may be used. While the message flow 600 depicts message flows between one UE and one gNB, the message flow 600 may be utilized with different combinations of UEs and gNBs since multiple combinations of wireless nodes (e.g., UEs and gNBs) may be configured to perform RF sensing operations.

In operation, the message flow 600 may be implemented to prevent MITM attacks for RF sensing, positioning and communications operations which utilize FMCW waveforms. In an example, the UE 602 may optionally send one or more capability messages 607 to the gNB 604 and/or the server 606. The capability messages may include indications regarding the capability of the UE 602 to utilize FMCW for RF sensing, positioning and communications. The capabilities of the UE 602 may be limited, for example, based on hardware or software precoding capability or buffering capability. Other features may also impact the capability of the UE 602 to partially process, store and descramble a FMCW signal. At stage 608 the gNB 604 and the server 606 may optionally exchange messages to establish a RF sensing scheme. For example, the RF sensing scheme may include the configurations for the FMCW waveforms described herein. The RF sensing scheme may be based at least in part on the capabilities of the UE 602 (or other sensing nodes in the network). The server 606 may be configured to coordinate the FMCW configurations for some or all of a communication network, such as the wireless communications system 100. The coordination between the gNBs 604 and the server 606 at stage 608 is an example and not a limitation, and a communication network may utilize other entities and messaging to implement the message flow 600.

The gNB 604 may be configured to generate and transmit one or more messages including a first set of parameters associated with a FMCW waveform. For example, a first FMCW configuration message 610 may include a first set of parameters including one or more of the FDRA information (e.g., the start frequency of the FMCW, the end frequency of the FMCW, etc.), the TDRA information (e.g., the start timing of the FMCW, the end timing of the FMCW, etc.), the slope of the FMCW, and the repetition times of the FMCW. The first FMCW configuration message 610 may include other information to enable the UE 602 to perform narrowband processing of the associated FMCW signal.

The gNB 604 (or other wireless nodes in the wireless communication system 100) may be configured to transmit one or more FMCW transmissions 612 to perform RF sensing, positioning and/or communication operations. The FMCW transmissions 612 are scrambled, but the UE 602 may utilize the information in the first FMCW configuration message 610 to partially process and store received FMCW transmissions 612 at stage 614. For example, the UE 602 may be configured to utilize the parameters included in the first FMCW configuration message 610 to receive and process a RF-wideband FMCW into BB-NB signals and store the NB signals in a buffer (e.g., the memory 340). The gNB 604 may transmit a second FMCW configuration message 616 after the FMCW transmissions 612. The second FMCW configuration message 616 may include a second set of parameters associated with the FMCW transmissions 612 such as indications for a method of scrambling (e.g., frequency-domain scrambling, time-domain scrambling, etc.), scrambling length information (e.g., the number of scrambling bits, etc.), scrambling ID information, modulation information associated with a method of the scrambling ID (e.g., BPSK, PI/2 BPSK, QPSK, etc.), an indication of a method for the scrambling sequence (e.g., raised-cosine filter, Gaussian low-pass filter, etc.), and comb pattern information. Other information to enable the UE 602 to descramble the FMCW transmissions 612 may be included in the second set of parameters. At stage 620, the UE 602 may utilize the parameters included in the second FMCW configuration message 616 to de-scramble the received FMCW transmissions 612 for further processing, such as for RF sensing, positioning and/or communication operations. In an example, the scrambling sequences may not be correlated with a scrambling sequence of previous transmitted FMCW (e.g., within slot/frame).

The message flow 600 may prevent MITM attacks in RF sensing operations because an attacker will be unable to spoof the RF sensing signals passing between the gNB 604 and the UE 602. That is, the attacker may receive the first FMCW configuration message 610, and may attempt to spoof the FMCW transmissions 612 based solely on the first FMCW configuration information. Such a spoofed signal, however, may be detected because the attacker will not know the scrambling method and scrambling ID (i.e., information included in the second FMCW information 616). The UE 602 may suppress or cancel the interference transmitted by the attacker using the correct scrambling method and scrambling ID indicated in the second FMCW configuration message 616.

Figure 7:
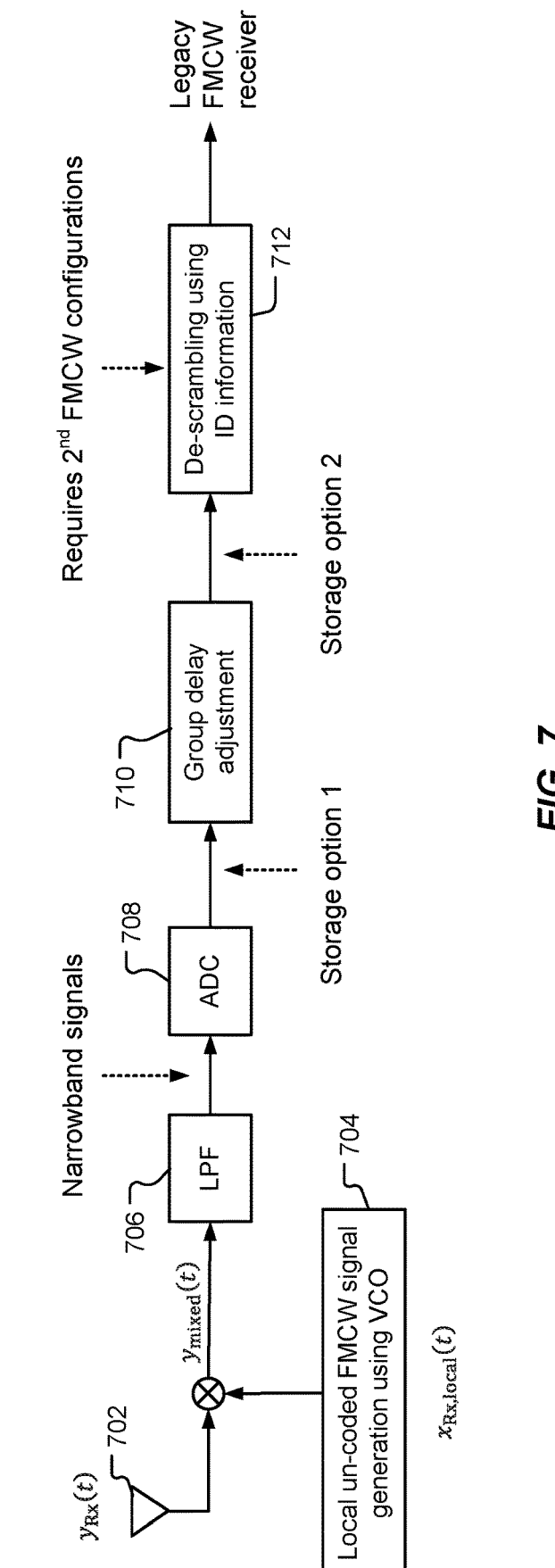
FIG. 7 is a system diagram of an example receiver structure for decoding phase-coded RF sensing signals.

Referring to FIG. 7, with further reference to FIG. 6, a system diagram of an example receiver structure for decoding phase-coded RF sensing signals is shown. A receiver 700 may be included in the UE 302 and/or the base station 304. For example, the receiver 700 may be included within one of the receivers 312, 352. The receiver 700 may be configured to perform descrambling at stage 620 as described in FIG. 6. FIG. 7 depicts descrambling operations performed by the UE 602 for a set of phase-coded FMCW signals (e.g., examples of the FMCW transmissions 612).

In operation, a set of phase-coded FMCW signals, such as $y_{Rx}(t)$, may be received by an antenna 702 of the receiver 700 from a transmitter node (e.g., the gNB 604). The receiver 700 (e.g., the UE 602) may utilize the first set of parameters included in the first FMCW configuration message 610 to generate the local un-coded FMCW signal for mixing the received RF-wideband FMCW into the BB-narrowband signals. For example, the received set of phase-coded FMCW signals may be mixed by a mixer with an un-coded FMCW signal: $x_{Rx,local}(t)$. The local un-coded FMCW signal may be generated using a voltage controlled oscillator (VCO) at the receiver 700, and may be represented as:

$$x_{Rx,local}(t) = \cos\left(2\pi\left(f_c + \frac{s}{2}t\right)t + \phi_0\right)\left(\frac{t - T/2}{T}\right) \quad (1)$$

The un-coded FMCW signal may be generated by a generator 704 of the receiver 700 with the received set of phase-coded FMCW signals to obtain a set of mixed FMCW signals: $y_{mixed}(t)$. The receiver 700 may be configured to process the set of mixed FMCW signals through at least one of a low pass filter (LPF) 706 or an analog-to-digital converter (ADC) 708 to obtain representations of the FMCW signals (i.e., a set of processed FMCW signals). The representations of the FMCW signals may be BB-narrowband signals and may be stored in a buffer (e.g., storage option 1). The receiver 700 may be configured to adjust the set of processed FMCW signals with a group delay adjustment 710 to obtain a set of aligned FMCW signals. The group delay adjustment 710 may be applied by the receiver 700 to align the per-tap signals in the time-domain for different paths. For instance, in some scenarios (e.g., due to one or more properties of the received set of phase-coded FMCW signals), a single filter may introduce different delay adjustments for different frequency components. In an example, the representations of the FMCW signals may be the aligned FMCW signals and may be stored in the buffer (e.g., storage option 2).

The receiver 700 may also be configured to receive the second FMCW configuration message 616 from the gNB 604 including an indication of a scrambling ID for at least one of a RF sensing, positioning or communication function. In an example, the UE 602 may be configured to send a capability report to the gNB 604 (or other transmitting node) including an indication of a maximum modulation order ($m_{max}$) (also referred to as maximum modulated order) of the phase-coded term for the receiver 700. The receiver 700 (e.g., the UE 602) may receive the second FMCW configuration message 616 including an indication of the modulation order of the coded phase together with the indication of the scrambling ID, or separately from the indication of the scrambling ID. The receiver 700 may be configured to apply a descrambling waveform based on the scrambling ID to the set of aligned FMCW signals (e.g., based on the group delay adjustment 710) via a decoder 712 to obtain the set of descrambled FMCW signals. The scrambling ID may be received via the second FMCW configuration message 616. The descrambling waveform may be applied after the group delay adjustment 710. An example descrambling waveform $C^*(t)$ may be a complex conjugate of $C(t)$, and may be represented as:

$$\sum_{l=1}^{L} \exp(-j\phi_l) \, rect\left(\frac{t - (l - 1/2) \cdot T/L}{T/L}\right) \quad (2)$$

The baseband (e.g., of the ADC 708) value may be sufficiently low for sufficient and accurate processing shown in FIG. 7. With reference to interference mitigation performance, when the receiver 700 uses the correct ID to decode the phase-coded FMCW, the system response converges to a traditional FMCW output, the first null of which appears at $$f = \pm\frac{1}{T},$$

or in terms of range $$\pm\frac{c}{2B},$$

where the compressed pulse length is c/B. However, when the receiver 700 uses an ID, e.g., the scrambling ID as described herein, to decode the phase-coded FMCW, then the system response is not focused and is spread through the range domain due to the phase-coded term $C(t)$, for which the first null appears at $$f = \pm\frac{1}{T},$$

or in terms of range $$\pm\frac{cL}{2B},$$

where the compressed pulse length is $$\frac{cL}{B}.$$

As the signal-to-noise ratio (SNR) may be proportional to the time bandwidth product, the SIR ratio may be calculated as 10 log L. That is, the interference mitigation performance, according to the aspects herein, may be better with a larger value of the coded phase length L.

Figure 8A:
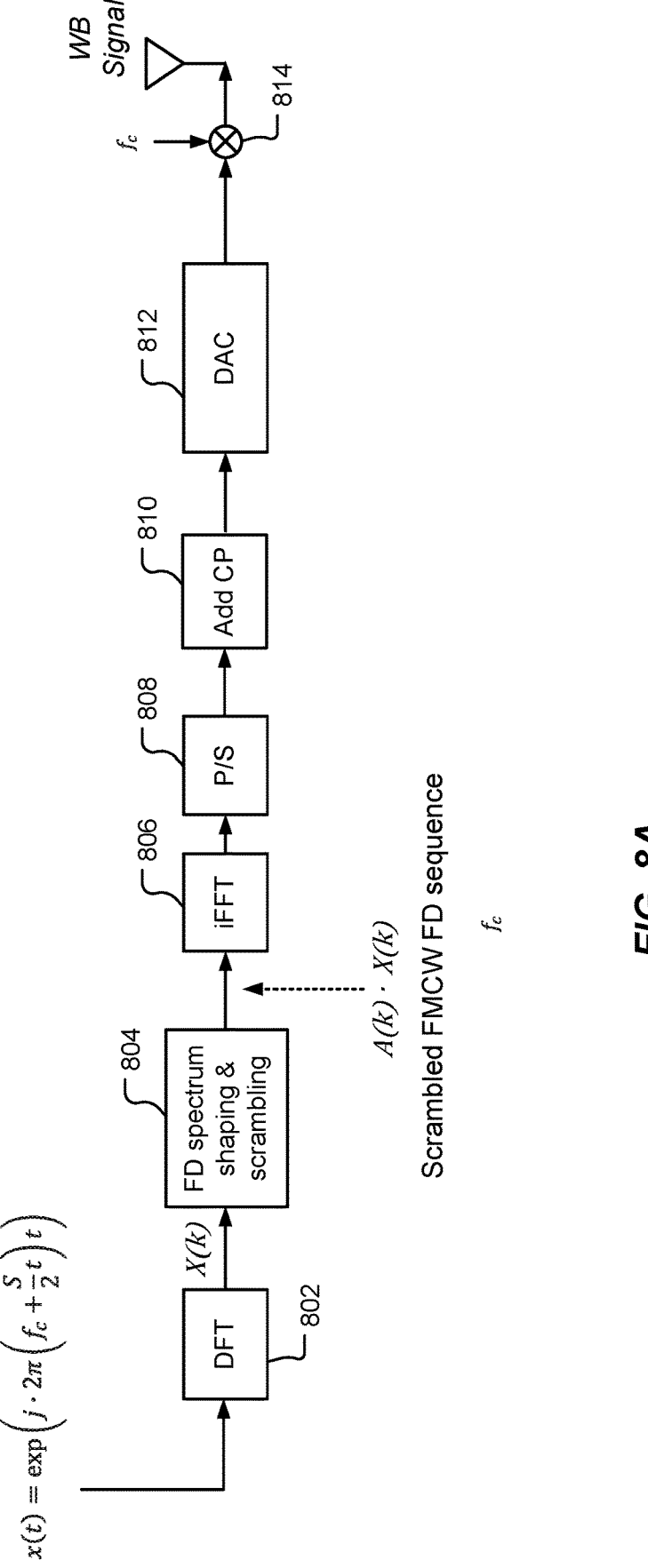
FIGS. 8A and 8B are system diagrams of example transmitter and receiver processes that support frequency domain (FD) scrambled RF sensing signals.
Figure 8B:
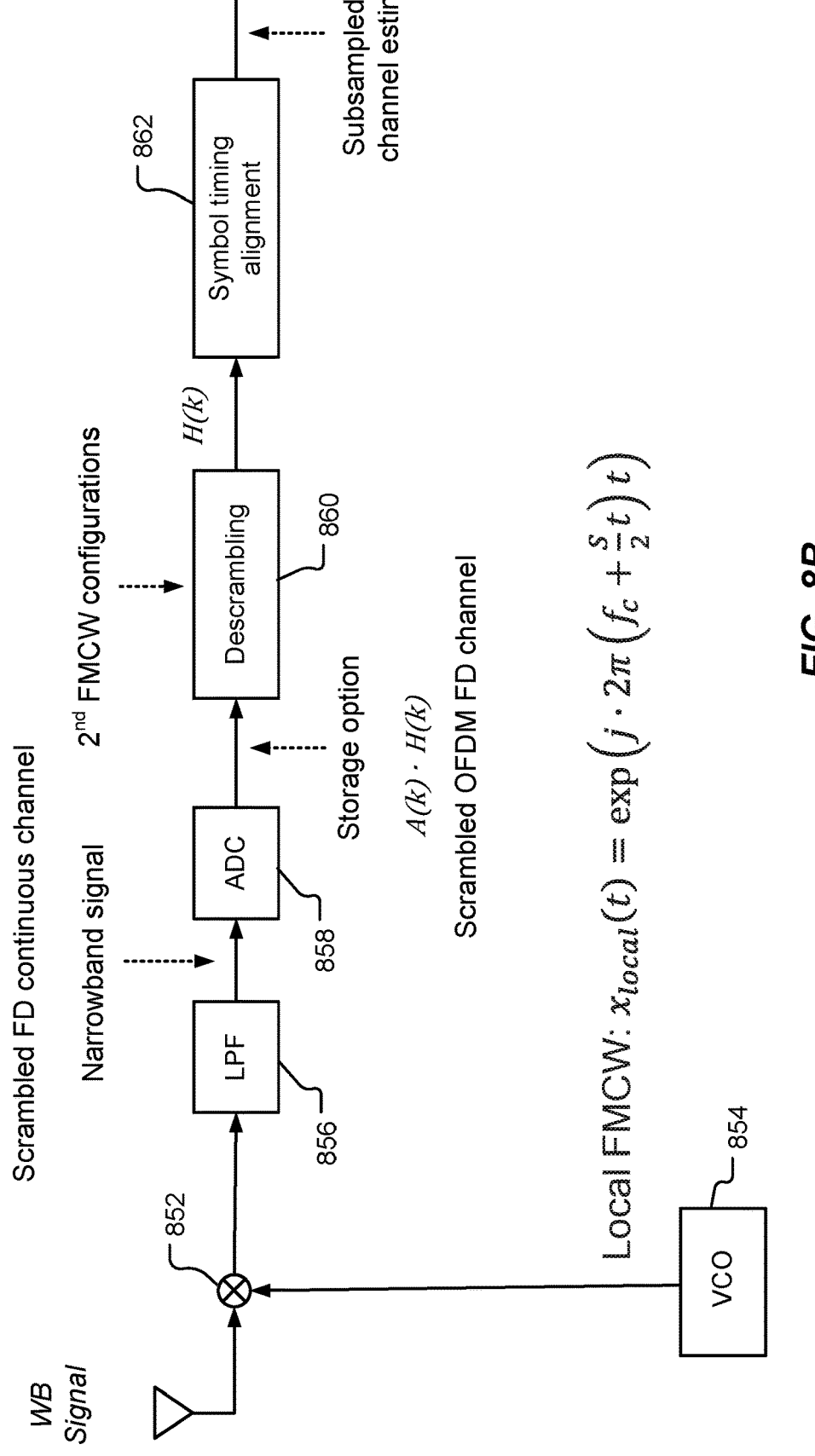

Referring to FIGS. 8A and 8B, system diagrams of example transmitter 800 and receiver 850 processes that support frequency domain (FD) scrambled RF sensing signals are shown. The processes described for the transmitter 800 and the receiver 850 may be implemented by wireless nodes in the wireless communication system 100. The UE 602 may include the receiver 850 and the gNB 604 may include the transmitter 800.

In operation, the transmitter 800 and the receiver 850 may communicate scrambled FMCW signaling via a channel, such that the scrambled FMCW signaling may be used for RF sensing, positioning and communication operations. The transmitter 800 may transmit an FMCW signal (e.g., a wideband (WB) signal) using an antenna (e.g., one or more antennas, antenna elements, antenna ports, antenna arrays, or any combination thereof) to the receiver 850. The receiver 850 may receive the FMCW signal (e.g., WB signal) using an antenna (e.g., one or more antennas, antenna elements, antenna ports, antenna arrays, or any combination thereof). The transmitter 800 may generate an FMCW signal (e.g., x(t)). The FMCW signal may be a carrier frequency signal (e.g., $$e^{j2\pi\left(f_c+\frac{s}{2}t\right)t}$$

in the analog domain. In some examples, the transmitter 800 may perform a discrete Fourier transform (DFT) 802 on the FMCW signal to produce a discrete FMCW signal (e.g., X(k)). The transmitter 800 may perform the DFT 802 using one or more components (e.g., hardware, software, or both) configured to produce a DFT of one or more signals. The transmitter 800 may be configured to perform FD spectrum shaping and scrambling 804 the discrete FMCW signal (e.g., the FMCW FD sequence, X(k)) with an FD scrambling sequence (e.g., A(k)) to produce a shaped and scrambled FMCW signal (e.g., A(k)*X(k)) in the FD. The FD scrambling sequence may be based on an algorithm, a lookup table, a device ID (e.g., cell ID, UE ID), or some combination thereof. In some cases, the transmitter 800 may perform the scrambling during FD signal processing.

The transmitter 800 may perform an inverse Fast Fourier transform (iFFT) 806 on the shaped and scrambled FMCW signal. The iFFT 806 may convert the signal from the FD to a time domain signal. For example, the iFFT 806 may produce a set of digital signals for transmission via time and frequency resources, the digital signals may be shaped and modified time domain digital signals from parallel to serial 808. The transmitter 800 may perform cyclic prefix (CP) addition 810 to add one or more CP(s) to the time domain digital signals. The transmitter 800 may use a digital-to-analog converter (DAC) 812 to convert the time domain digital signals to one or more time domain analog signals.

In an example, the transmitter 800 may combine the time domain analog signal with a carrier frequency signal $f_c$ using a mixer 814. The mixer 814 may include one or more components (e.g., hardware, software, or both) of the transmitter 800 that are configured to combine two or more signals. The output of the mixer may be the FMCW signal (i.e., the WB signal). For example, an FMCW signal (e.g., a wideband signal or other signal) may represent H(k)*A (k)*X(k) in the FD, where H(k) may represent the FD channel at tone k (e.g., at a serving cell), A(k) may represent the FD scrambling sequence, and X(k) may represent the FMCW FD sequence. In some examples, the transmitter 800 may transmit the FMCW signal to the receiver 850 for RF sensing, positioning, and/or communications operations.

The receiver 850 is an example of an analog receiver and may be configured to receive at least a portion of the canceled FMCW signal (e.g., the WB signal). Digital receivers may also be used to receive and descramble the FMCW signal. The receiver 850 may be configured to generate a FMCW signal (e.g., a local FMCW signal $x_{local}(t)$) using a VCO 854. In some cases, the FMCW signal may be an example of a local carrier frequency signal (e.g., $$e^{j2\pi\left(f_c+\frac{s}{2}t\right)t}$$

in the analog domain. The local FMCW signal generated at the receiver 850 may have similar FMCW structures as the FMCW signal transmitted by the transmitter 800. The exponential function representing the local FMCW signal generated by the receiver 850 may be configured for channel estimation for example, with a received FMCW signal.

The receiver 850 may generate a combined FMCW signal using the received FMCW signal and the generated local FMCW signal with a mixer 852. The mixer 852 may include one or more components (e.g., hardware, software, or both) that are configured to combine two or more signals.

The receiver 850 may filter the combined FMCW signal using an LPF 856 by applying an LPF function to the combined FMCW signal. The LPF 856 may generate a combined and filtered FMCW signal. The LPF 856 may be an example of a component of the receiver 850 that is configured to filter signals or a function supported by the receiver 850. The receiver 850 may utilize use an ADC 858 to sample the combined and filtered FMCW signal in the time domain. In some examples, the output of the ADC 858 may be an example of (or similar to) a multiplication (e.g., A(k)*H(k)) of a scrambling sequence (e.g., A(k)) and the FD channel at a tone k (e.g., H(k)) in the FD. A sampling rate used to sample the combined and filtered FMCW signals may be based on one or more parameters. In some cases, the sampling rate (e.g., ADC rate) for the receiver 850 may be relatively lower compared to a digital receiver. In an example, the receiver 850 may utilize the first FMCW configuration message 610 to determine the sampling rate.

The receiver 850 (e.g., the UE 602) may utilize the first FMCW configuration message 610 to generate the local un-coded FMCW signal for mixing the received RF-wideband FMCW into the BB-narrowband signals. The output of the ADC 858 may be stored in a buffer until the second FMCW configuration message 616 is received. The receiver 850 may then descramble 860 the output of the ADC 858 based on the second set of parameters included in the second FMCW configuration message 616 (e.g., according to a FD scrambling sequence). The receiver 850 may perform the descrambling 860 on the signals in the buffer using one or more components (e.g., hardware, software, or both) configured to descramble FMCW signals. In some cases, the receiver 850 may descramble the FMCW signal during time domain signal processing.

The receiver 850 may be configured to perform a symbol timing alignment 862 on the output of the descrambling process. In some examples, the output of the symbol timing alignment 862 may be a subsampled FD channel estimate of the channel. The receiver 850 may descramble FMCW signals for channel estimation. The differentiated FMCW signals may be utilized for RF sensing, positioning and communications applications.

Figure 9:
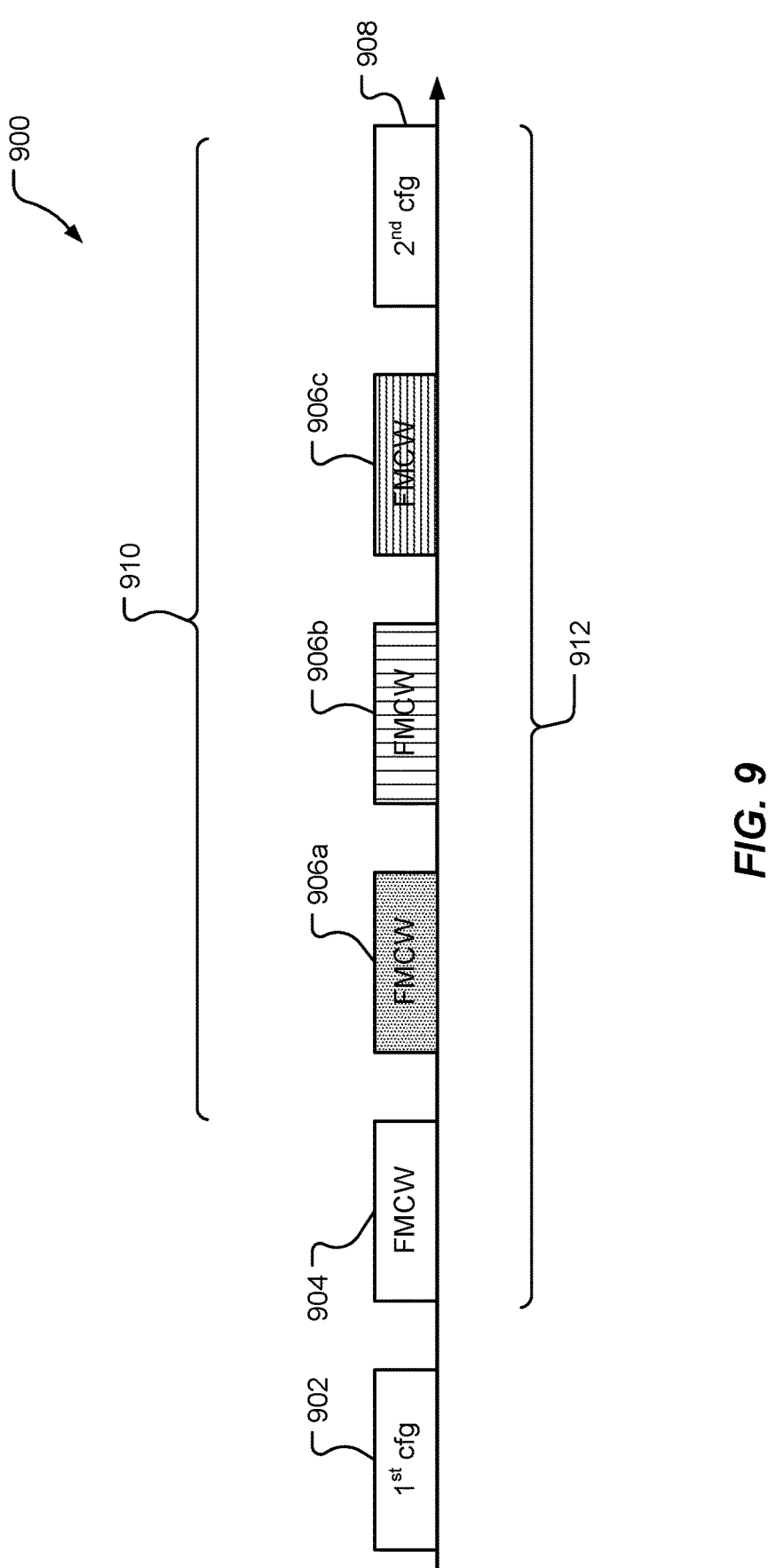
FIG. 9 is a timing diagram including example buffering periods.

Referring to FIG. 9, with further reference to FIG. 6, a timing diagram 900 including example buffering periods is shown. In operation, the FMCW transmissions 612 may be transmitted in different FMCW occasions and may be scrambled by different scrambling sequences. For example, a first FMCW transmission 904 may be associated with a first FMCW configuration message 902 and a second FMCW configuration message 908. The scrambling sequences for an FMCW may not be correlated with the scrambling sequences scrambled by previously transmitted FMCW, such that the previous transmitted FMCW may be defined as being within the same slot, within the same frame, or within N previous FMCW transmissions. In an example, the first set of parameters in the first FMCW configuration message 902 may indicate the parameters of one or more of the following FMCW transmissions. The second set of parameters in the second FMCW configuration message 908 may indicate the parameters of one or more of the previous FMCW transmissions, but the scrambling sequences may be different. For example, the scrambling sequences for a second FMCW transmission 906a, a third FMCW transmission 906b, and the fourth FMCW transmission 906c, may be different.

In an example, the UE 602 may be configured to provide FMCW buffering capabilities to the gNB 604 (or other network resource). Referring to the timing diagram 900, the FMCW buffering period may indicate how long the UE 602 may buffer the partially-processed FMCW signals before receiving (or applying) the second set of FMCW configurations. In an example, the buffering period may mean how many partially-processed FMCW signals the UE 602 may buffer in memory. In a first example, a first buffering period 910 may be insufficient to descramble the first FMCW transmission because the buffer may be overwritten by the additional FMCW transmissions 906*a-c* before the second FMCW configuration message 908 arrives. In a second example, the second buffering period 912 is sufficient to process the first FMCW transmission 904 based on the second FMCW configuration message 908.

Figure 10:
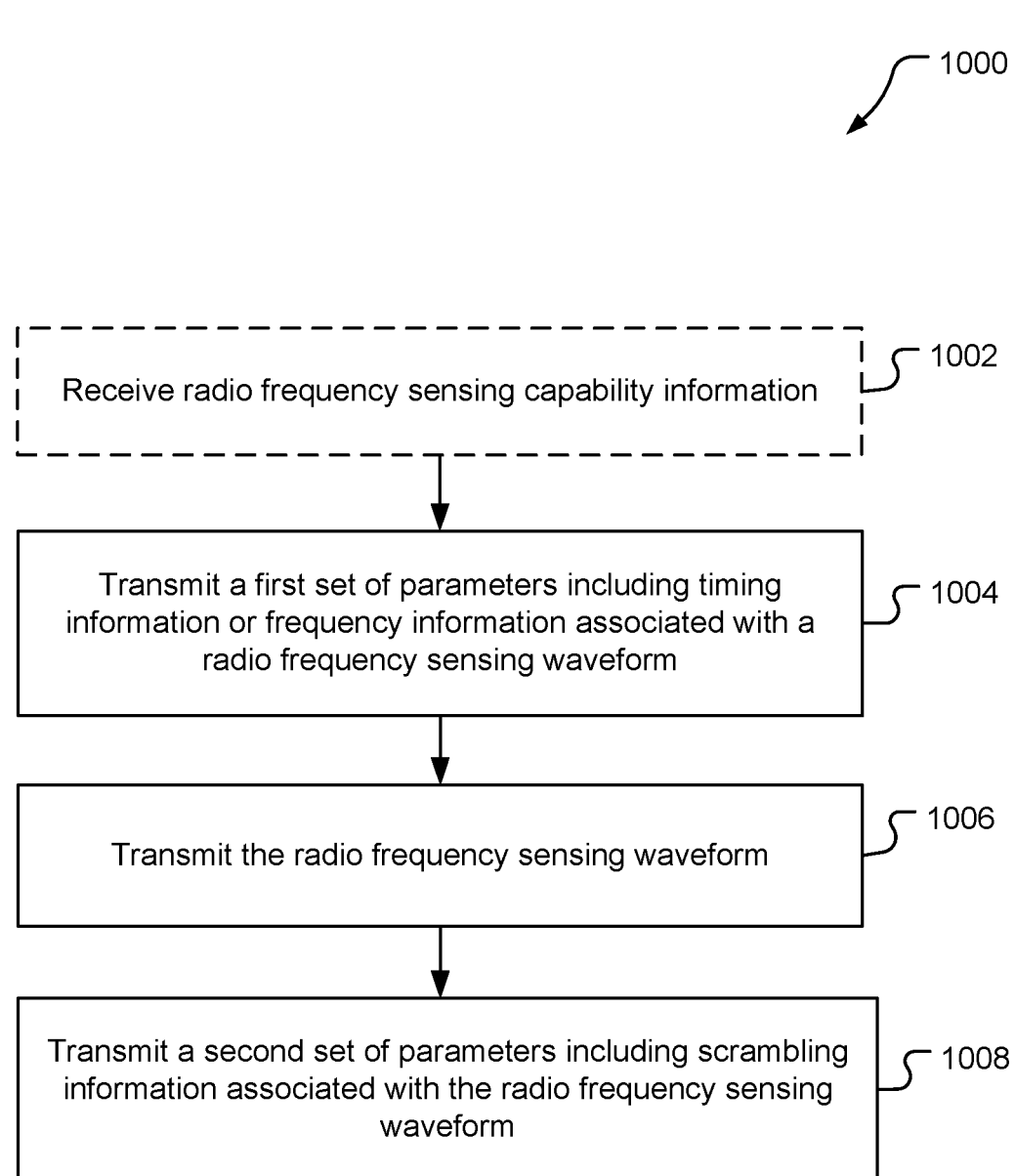
FIG. 10 is an example process flow diagram of a method for transmitting a secure RF sensing waveform.

Referring to FIG. 10, with further reference to FIGS. 1-9, a method 1000 for transmitting a secure RF sensing waveform includes the stages shown. A base station 304, such as the gNB 604, or other wireless nodes described herein (e.g., a UE 302), may be configured to transmit secure RF sensing waveforms. The method 1000 is, however, an example and not limiting. The method 1000 may be altered, e.g., by having stages added, removed, rearranged, combined, performed concurrently, and/or having single stages split into multiple stages. For example, receiving RF sensing capability information at stage 1002 is optional.

At stage 1002, the method optionally includes receiving radio frequency sensing capability information. A network entity 306, including the processing system 394 and the network interface 390, is a means for receiving RF sensing capability information. Other wireless nodes, such as the base station 304 may also be a means for receiving RF sensing capability information. A sensing node, such as the UE 602 and/or the gNB 604, may be configured to provide one or more capability messages 607 including information describing the ability of the UE 602 and/or the gNB 604 to perform RF sensing, positioning and/or communication operations. The capability of a sensing node to utilize secure FMCW signals may be limited based on hardware or software capability or buffering capability. The server 606 may be configured to utilize the capabilities of a sensing node to generate an RF sensing scheme.

At stage 1004, the method includes transmitting a first set of parameters including timing information or frequency information associated with a radio frequency sensing waveform. The base station 304, including the processing system 384 and the transceiver 350, is a means for transmitting the first set of parameters. In an example, the gNB 604 may be configured to generate and transmit one or more messages including the first set of parameters associated with a FMCW waveform. The first FMCW configuration message 610 may include the first set of parameters including frequency information such as the FDRA information (e.g., the start frequency of the FMCW, the end frequency of the FMCW, etc.), the timing information such as the TDRA information (e.g., the start timing of the FMCW, the end timing of the FMCW, etc.). The first set of parameters may also include other information to enable a UE (or other sensing nodes) to perform narrowband processing of a FMCW signal. For example, the first set of parameters may include the slope of the FMCW, and the repetition times of the FMCW. Other parameters may also be included. In an example, the RF sensing waveform may be based on other OFDM and RF sensing waveforms and the first set of parameters may be configured to enable a sensing node to perform partial processing and storage of a received RF sensing signal.

At stage 1006, the method includes transmitting the radio frequency sensing waveform. The base station 304, including the processing system 384 and the transceiver 350, is a means for transmitting the RF sensing waveform. In an example, the gNB 604 (or other wireless nodes in the wireless communication system 100) may be configured to transmit one or more FMCW transmissions 612 to perform RF sensing, positioning and/or communication operations. The FMCW transmissions 612 are scrambled, but the UE 602 may utilize the first set of parameters transmitted at stage 1004 to partially process and store a received FMCW transmissions 612. For example, the UE 602 may be configured to utilize the first set of parameters to receive and process a RF-wideband FMCW into a BB-NB signals and store the NB signals in a buffer (e.g., the memory 340).

At stage 1008, the method includes transmitting a second set of parameters including scrambling information associated with the radio frequency sensing waveform. The base station 304, including the processing system 384 and the transceiver 350, is a means for transmitting the second set of parameters. In an example, the gNB 604 may transmit the second set of parameters in one or more second FMCW configuration messages 616. The second set of parameters are transmitted after the transmission of the RF sensing waveform at stage 1006. The second set of parameters includes scrambling information such as an indication for a method of scrambling (e.g., frequency-domain scrambling, time-domain scrambling, etc.), scrambling length parameters (e.g., the number of scrambling bit, etc.), scrambling ID information, modulation information associated with a method of the scrambling ID (e.g., BPSK, PI/2 BPSK, QPSK, etc.), an indication of a method for the scrambling sequence (e.g., raised-cosine filter, Gaussian low-pass filter, etc.), and comb pattern information. Other scrambling information to enable the sensing node to descramble the RF sensing waveform may be included in the second set of parameters. In operation, the sensing node may utilize the second set of parameters to descramble the received RF sensing signal (e.g., as described in FIGS. 7, 8B) for further processing, such as for RF sensing, positioning and/or communication operations.

Referring to FIG. 11, with further reference to FIGS. 1-9, a method 1100 for receiving a secure RF sensing waveform includes the stages shown. A sensing node, such as a gNB or UE, may be configured to receive a secure RF sensing waveform. The method 1100 may utilize different over-the-air signaling described as uplink and down link reference signals. In an example, sidelink signals (e.g., between UEs and/or other reference location devices) may also be used to receive secure RF waveform information. The method 1100 is, however, an example and not limiting. The method 1100 may be altered, e.g., by having stages added, removed, rearranged, combined, performed concurrently, and/or having single stages split into multiple stages. For example, transmitting RF sensing capability information at stage 1102 is optional.

At stage 1102, the method includes transmitting radio frequency sensing capability information. A UE 302, including the processing system 332 and the transceiver 310, is a means for transmitting RF sensing capability information. Other wireless nodes, such as the base station 304 may also be a means for transmitting RF sensing capability information. A sensing node, such as the UE 602 and/or the gNB 604, may be configured to provide one or more capability messages 607 including information describing the ability of the UE 602 and/or the gNB 604 to perform RF sensing, positioning and/or communication operations. The capability of a sensing node to utilize secure FMCW signals may be limited based on hardware or software capability or buffering capability. In an example, a network resource, such as the server 606, may be configured to utilize the capabilities of a sensing node to generate an RF sensing scheme.

At stage 1104, the method includes receiving a first set of parameters associated with a radio frequency sensing waveform. The UE 302, including the processing system 332 and the transceiver 310, is a means for receiving the first set of parameters. A network station (e.g., the gNB 604) may be configured to transmit one or more messages including the first set of parameters associated with a RF sensing waveform. In an example, the RF sensing waveform may be a FMCW waveform and may be utilized for RF sensing, positioning and communication operations. The first set of parameters may include frequency information such as FDRA information (e.g., the start frequency of the FMCW, the end frequency of the FMCW, etc.), timing information such as TDRA information (e.g., the start timing of the FMCW, the end timing of the FMCW, etc.). The first set of parameters may also include other information to enable a UE (or other sensing nodes) to perform narrowband processing of a FMCW signal. For example, the first set of parameters may include the slope of the FMCW, and the repetition times of the FMCW. Other parameters may also be included. In an example, the RF sensing waveform may be based on other OFDM and RF sensing waveforms and the first set of parameters may be configured to enable partial processing and storage of a received RF sensing signal.

At stage 1106, the method includes receiving one or more sensing signals based at least in part on the first set of parameters. The UE 302, including the processing system 332 and the transceiver 310, is a means for receiving the one or more sensing signals. A network station (e.g., the gNB 604 or other wireless nodes in the wireless communication system 100) may be configured to transmit one or more RF sensing signals to perform RF sensing, positioning and/or communication operations. In an example, the RF sensing signals may be the FMCW transmissions 612 which are scrambled, but the UE 602 may utilize the first set of parameters transmitted at stage 1004 to partially process and store a received FMCW transmissions 612. For example, the UE 602 may be configured to utilize the first set of parameters to receive and process a RF-wideband FMCW into a BB-NB signals and store the NB signals in a buffer (e.g., the memory 340).

At stage 1108, the method includes storing representations of the one or more sensing signals in a memory buffer. The UE 302, including the processing system 332, the memory 340, and the transceiver 310, is a means for storing the representations the one or more sensing signals. The transceiver 310 may include one or more receivers 312 configured to perform the operations as described in FIGS. 7 and 8A. In an example, the one or more sensing signals may be a set of phase-coded FMCW signals, such as $y_{Rx}(t)$ described in FIG. 7. The UE may utilize the first set of parameters received at stage 1106 to generate the local un-coded FMCW signal for mixing the received RF-wideband FMCW into the BB-narrowband signals. The representations of the one or more sensing signals may be the BB-narrowband signals and may be stored in a buffer (e.g., storage option 1). In an example, the set of processed FMCW signals may be modified with a group delay adjustment to obtain a set of aligned FMCW signals. The group delay adjustment may be applied to align the per-tap signals in the time-domain for different paths. In an example, the representations of the one or more sensing signals may be the aligned FMCW signals and may be stored in the buffer (e.g., storage option 2). In an example, referring to FIG. 8B, the output of the ADC may be stored in a buffer.

At stage 1110, the method includes receiving a second set of parameters associated with the radio frequency sensing waveform. The UE 302, including the processing system 332 and the transceiver 310, is a means for receiving the second set of parameters. In an example, the UE 602 may receive the second set of parameters in one or more second FMCW configuration messages 616 transmitted by the gNB 604 (or other wireless node). The second set of parameters are received after receiving the one or more sensing signals at stage 1106. The second set of parameters may include scrambling information such as an indication for a method of scrambling (e.g., frequency-domain scrambling, time-domain scrambling, etc.), scrambling length information (e.g., the number of scrambling bit, etc.), scrambling ID information, modulation information associated with a method of the scrambling ID (e.g., BPSK, PI/2 BPSK, QPSK, etc.), an indication of a method for the scrambling sequence (e.g., raised-cosine filter, Gaussian low-pass filter, etc.), and comb pattern information. Other scrambling information to enable the sensing node to descramble the RF sensing waveform may be included in the second set of parameters.

At stage 1112, the method includes descrambling the one or more sensing signals in the memory buffer based on the second set of parameters. The UE 302, including the processing system 332, and the memory 340, is a means for descrambling at least a portion of the one or more sensing signals. A sensing node (e.g., the UE 602) may utilize the second set of parameters to descramble the received sensing signal (e.g., as described in FIGS. 7, 8B) for further processing, such as for RF sensing, positioning and/or communication operations. In an example, referring to FIG. 7, the second set of parameters received at stage 1110 may include an indication of the modulation order of the coded phase and/or an indication of a scrambling ID. The UE 602 may be configured to apply a descrambling waveform based on the scrambling ID to the sensing signal stored in the memory buffer at stage 1108 to obtain the set of descrambled sensing signals. In an example, referring to FIG. 8B, the UE 602 may be configured to descramble the output of the ADC 858 based on the second set of parameters (e.g., according to a FD scrambling sequence). In an example, the UE 602 may be configured to descramble the sensing signal during time domain signal processing.

The methods 1000 and 1100 may be implemented to reduce the risks of MITM attacks because the attacker cannot know the scrambling information prior to the transmission of the sensing signal. In a first use case, a sensing node (e.g., UE 602) and a potential attacker may both receive the FMCW configurations when a FMCW sensing signal is a broadcast/multicast/groupcast reference signal and the attacker is in the group. The attacker may obtain the first set of parameters (e.g., the first FMCW configuration message 610), but the attacker will not know the scrambling method and/or the scrambling ID. During the FMCW transmissions 612, if attacker uses a different scrambling method and/or scrambling ID, the UE 602 may suppress/cancel the interference transmitted by the attacker based on the correct scrambling method and/or scrambling ID provided in the second set of parameters (e.g., the second FMCW configuration message 616).

In a second use case, the attacker may blindly monitor the previous FMCW, and blindly guess the FMCW configurations for the next FMCW configurations. The methods 1000 and 1100 may overcome such an attack because the scrambling sequences for a sensing signal may not be correlated with the scrambling sequences scrambled by previously transmitted sensing signals. The lack of correlation between the scrambling sequences may reduce the chance that the attacker will be able to blindly guess the sensing signal configurations based on previous sensing signal configurations.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

Clause 1. A method for transmitting a radio frequency sensing waveform, comprising: transmitting a first set of parameters including timing information or frequency information associated with the radio frequency sensing waveform; transmitting the radio frequency sensing waveform; and transmitting a second set of parameters including scrambling information associated with the radio frequency sensing waveform.

Clause 2. The method of clause 1, wherein the frequency information in the first set of parameters includes frequency domain resource allocation information for the radio frequency sensing waveform.

Clause 3. The method of clause 2, wherein the frequency domain resource allocation information includes a start frequency of the radio frequency sensing waveform and an end frequency of the radio frequency sensing waveform.

Clause 4. The method of clause 1, wherein the timing information in the first set of parameters includes time domain resource allocation information for the radio frequency sensing waveform.

Clause 5. The method of clause 4, wherein the time domain resource allocation information includes a start timing of the radio frequency sensing waveform and an end timing of the radio frequency sensing waveform.

Clause 6. The method of clause 1, wherein the radio frequency sensing waveform is a frequency modulated continuous wave signal.

Clause 7. The method of clause 6, wherein the first set of parameters includes a slope of the frequency modulated continuous wave signal and a repetition time of the frequency modulated continuous wave signal.

Clause 8. The method of clause 1, wherein the scrambling information in the second set of parameters includes at least one of an indication for a method of scrambling, a scrambling length parameter, a scrambling ID, an indication of a method of the scrambling ID, an indication of a method for a scrambling sequence, and a comb pattern.

Clause 9. The method of clause 1, wherein the radio frequency sensing waveform is configured for at least one of radio frequency sensing operations, positioning operations, and communication operations.

Clause 10. The method of clause 1, further comprising receiving radio frequency sensing capability information from a wireless node.

Clause 11. A method for receiving a radio frequency sensing waveform, comprising: receiving a first set of parameters associated with the radio frequency sensing waveform; receiving one or more sensing signals based at least in part on the first set of parameters; storing representations of the one or more sensing signals in a memory buffer; receiving a second set of parameters associated with the radio frequency sensing waveform; and descrambling the representations of the sensing signals in the memory buffer based on the second set of parameters.

Clause 12. The method of clause 1, wherein the first set of parameters includes frequency domain resource allocation information for the radio frequency sensing waveform.

Clause 13. The method of clause 12, wherein the frequency domain resource allocation information includes a start frequency of the radio frequency sensing waveform and an end frequency of the radio frequency sensing waveform.

Clause 14. The method of clause 11, wherein the first set of parameters includes time domain resource allocation information for the radio frequency sensing waveform.

Clause 15. The method of clause 14, wherein the time domain resource allocation information includes a start timing of the radio frequency sensing waveform and an end timing of the radio frequency sensing waveform.

Clause 16. The method of clause 11, wherein the radio frequency sensing waveform is a frequency modulated continuous wave signal.

Clause 17. The method of clause 11, wherein the representations of the one or more sensing signals includes a narrowband signal or an aligned frequency modulated continuous wave signal.

Clause 18. The method of clause 11, wherein the second set of parameters includes at least one of an indication for a method of scrambling, a scrambling length parameter, a scrambling ID, an indication of a method of the scrambling ID, an indication of a method for a scrambling sequence, and a comb pattern.

Clause 19. The method of clause 11, wherein the radio frequency sensing waveform is configured for at least one of radio frequency sensing operations, positioning operations, and communication operations.

Clause 20. The method of clause 11, further comprising transmitting radio frequency sensing capability information to a base station.

Clause 21. An apparatus, comprising: at least one memory; at least one transceiver; at least one processor communicatively coupled to the at least one memory and the at least one transceiver, and configured to: transmit a first set of parameters including timing information or frequency information associated with a radio frequency sensing waveform; transmit the radio frequency sensing waveform; and transmit a second set of parameters including scrambling information associated with the radio frequency sensing waveform.

Clause 22. The apparatus of clause 21, wherein the frequency information in the first set of parameters includes frequency domain resource allocation information for the radio frequency sensing waveform.

Clause 23. The apparatus of clause 22, wherein the frequency domain resource allocation information includes a start frequency of the radio frequency sensing waveform and an end frequency of the radio frequency sensing waveform.

Clause 24. The apparatus of clause 21, wherein the timing information in the first set of parameters includes time domain resource allocation information for the radio frequency sensing waveform.

Clause 25. The apparatus of clause 24, wherein the time domain resource allocation information includes a start timing of the radio frequency sensing waveform and an end timing of the radio frequency sensing waveform.

Clause 26. The apparatus of clause 21, wherein the radio frequency sensing waveform is a frequency modulated continuous wave signal.

Clause 27. The apparatus of clause 26, wherein the first set of parameters includes a slope of the frequency modulated continuous wave signal and a repetition time of the frequency modulated continuous wave signal.

Clause 28. The apparatus of clause 21, wherein the scrambling information in the second set of parameters includes at least one of an indication for a method of scrambling, a scrambling length parameter, a scrambling ID, an indication of a method of the scrambling ID, an indication of a method for a scrambling sequence, and a comb pattern.

Clause 29. The apparatus of clause 21, wherein the radio frequency sensing waveform is configured for at least one of radio frequency sensing operations, positioning operations, and communication operations.

Clause 30. The apparatus of clause 21, wherein the at least one processor is further configured to receive radio frequency sensing capability information from a wireless node.

Clause 31. An apparatus, comprising: at least one memory; at least one transceiver; at least one processor communicatively coupled to the at least one memory and the at least one transceiver, and configured to: receive a first set of parameters associated with a radio frequency sensing waveform; receive one or more sensing signals based at least in part on the first set of parameters; store representations of the one or more sensing signals in a memory buffer; receive a second set of parameters associated with the radio frequency sensing waveform; and descramble the representations of the one or more sensing signals in the memory buffer based on the second set of parameters.

Clause 32. The apparatus of clause 31, wherein the first set of parameters includes frequency domain resource allocation information for the radio frequency sensing waveform.

Clause 33. The apparatus of clause 32, wherein the frequency domain resource allocation information includes a start frequency of the radio frequency sensing waveform and an end frequency of the radio frequency sensing waveform.

Clause 34. The apparatus of clause 31, wherein the first set of parameters includes time domain resource allocation information for the radio frequency sensing waveform.

Clause 35. The apparatus of clause 34, wherein the time domain resource allocation information includes a start timing of the radio frequency sensing waveform and an end timing of the radio frequency sensing waveform.

Clause 36. The apparatus of clause 31, wherein the radio frequency sensing waveform is a frequency modulated continuous wave signal.

Clause 37. The apparatus of clause 36, wherein the first set of parameters includes a slope of the frequency modulated continuous wave signal and a repetition time of the frequency modulated continuous wave signal.

Clause 38. The apparatus of clause 31, wherein the second set of parameters includes at least one of an indication for a method of scrambling, a scrambling length parameter, a scrambling ID, an indication of a method of the scrambling ID, an indication of a method for a scrambling sequence, and a comb pattern.

Clause 39. The apparatus of clause 31, wherein the radio frequency sensing waveform is configured for at least one of radio frequency sensing operations, positioning operations, and communication operations.

Clause 40. The apparatus of clause 31, wherein the at least one processor is further configured to transmit radio frequency sensing capability information to a base station.

Clause 41. An apparatus for transmitting a radio frequency sensing waveform, comprising: means for transmitting a first set of parameters including timing information or frequency information associated with the radio frequency sensing waveform; means for transmitting the radio frequency sensing waveform; and means for transmitting a second set of parameters including scrambling information associated with the radio frequency sensing waveform.

Clause 42. An apparatus for receiving a radio frequency sensing waveform, comprising: means for receiving a first set of parameters associated with the radio frequency sensing waveform; means for receiving one or more sensing signals based at least in part on the first set of parameters; means for storing representations of the one or more sensing signals in a memory buffer; means for receiving a second set of parameters associated with the radio frequency sensing waveform; and means for descrambling the representations of the one or more sensing signals in the memory buffer based on the second set of parameters.

Clause 43. A non-transitory processor-readable storage medium comprising processor-readable instructions configured to cause one or more processors to transmit a radio frequency sensing waveform, comprising code for: transmitting a first set of parameters including timing information or frequency information associated with the radio frequency sensing waveform; transmitting the radio frequency sensing waveform; and transmitting a second set of parameters including scrambling information associated with the radio frequency sensing waveform.

Clause 44. A non-transitory processor-readable storage medium comprising processor-readable instructions configured to cause one or more processors to receive a radio frequency sensing waveform, comprising code for: receiving a first set of parameters associated with the radio frequency sensing waveform; receiving one or more sensing signals based at least in part on the first set of parameters; storing representations of the one or more sensing signals in a memory buffer; receiving a second set of parameters associated with the radio frequency sensing waveform; and descrambling the representations of the one or more sensing signals in the memory buffer based on the second set of parameters.

What is claimed is:

1. A method for transmitting a radio frequency sensing waveform, comprising:

transmitting a first message including a first set of parameters including timing information or frequency information associated with the radio frequency sensing waveform, the first message lacking scrambling information associated with the radio frequency sensing waveform;

transmitting the radio frequency sensing waveform; and transmitting a second message separately from and subsequent to the first message, the second message including a second set of parameters including the scrambling information associated with the radio frequency sensing waveform.

2. The method of claim 1, wherein the frequency information in the first set of parameters includes frequency domain resource allocation information for the radio frequency sensing waveform.

3. The method of claim 2, wherein the frequency domain resource allocation information includes a start frequency of the radio frequency sensing waveform and an end frequency of the radio frequency sensing waveform.

4. The method of claim 1, wherein the timing information in the first set of parameters includes time domain resource allocation information for the radio frequency sensing waveform.

5. The method of claim 4, wherein the time domain resource allocation information includes a start timing of the radio frequency sensing waveform and an end timing of the radio frequency sensing waveform.

6. The method of claim 1, wherein the radio frequency sensing waveform is a frequency modulated continuous wave signal.

7. The method of claim 6, wherein the first set of parameters includes a slope of the frequency modulated continuous wave signal and a repetition time of the frequency modulated continuous wave signal.

8. The method of claim 1, wherein the scrambling information in the second set of parameters includes at least one of an indication for a method of scrambling, a scrambling length parameter, a scrambling ID, an indication of a method of the scrambling ID, an indication of a method for a scrambling sequence, and a comb pattern.

9. The method of claim 1, wherein the radio frequency sensing waveform is configured for at least one of radio frequency sensing operations, positioning operations, and communication operations.

10. The method of claim 1, further comprising receiving radio frequency sensing capability information from a wireless node.

11. An apparatus, comprising:

at least one memory;

at least one transceiver;

at least one processor communicatively coupled to the at least one memory and the at least one transceiver, and configured to:

receive a first message including a first set of parameters associated with a radio frequency sensing waveform, the first message lacking scrambling information associated with the radio frequency sensing waveform;

receive one or more sensing signals based at least in part on the first set of parameters;

store representations of the one or more sensing signals in a memory buffer;

receive a second message separately from the first message, the second message including a second set of parameters including the scrambling information associated with the radio frequency sensing waveform; and descramble the representations of the one or more sensing signals in the memory buffer based on the second set of parameters and based on the second message being received after the first message.

12. A method for receiving a radio frequency sensing waveform, comprising:

receiving a first message including a first set of parameters associated with the radio frequency sensing waveform, the first message lacking scrambling information associated with the radio frequency sensing waveform;

receiving one or more sensing signals based at least in part on the first set of parameters;

storing representations of the one or more sensing signals in a memory buffer;

receiving a second message separately from the first message, the second message including a second set of parameters including the scrambling information associated with the radio frequency sensing waveform; and descrambling the representations of the one or more sensing signals in the memory buffer based on the second set of parameters and based on the second message being received after the first message.

13. The method of claim 12, wherein the first set of parameters includes frequency domain resource allocation information for the radio frequency sensing waveform.

14. The method of claim 13, wherein the frequency domain resource allocation information includes a start frequency of the radio frequency sensing waveform and an end frequency of the radio frequency sensing waveform.

15. The method of claim 12, wherein the first set of parameters includes time domain resource allocation information for the radio frequency sensing waveform.

16. The method of claim 15, wherein the time domain resource allocation information includes a start timing of the radio frequency sensing waveform and an end timing of the radio frequency sensing waveform.

17. The method of claim 12, wherein the radio frequency sensing waveform is a frequency modulated continuous wave signal.

18. The method of claim 12, wherein the representations of the one or more sensing signals includes a narrowband signal or an aligned frequency modulated continuous wave signal.

19. The method of claim 12, wherein the second set of parameters includes at least one of an indication for a method of scrambling, a scrambling length parameter, a scrambling ID, an indication of a method of the scrambling ID, an indication of a method for a scrambling sequence, and a comb pattern.

20. The method of claim 12, wherein the radio frequency sensing waveform is configured for at least one of radio frequency sensing operations, positioning operations, and communication operations.

21. The method of claim 12, further comprising transmitting radio frequency sensing capability information to a base station.

22. The method of claim 1, wherein transmitting the second message comprises transmitting the second message subsequent to transmitting the radio frequency sensing waveform.

23. An apparatus, comprising:

at least one memory;

at least one transceiver;

at least one processor communicatively coupled to the at least one memory and the at least one transceiver, and configured to:

transmit a first message including a first set of parameters including timing information or frequency information associated with a radio frequency sensing waveform, the first message lacking scrambling information associated with the radio frequency sensing waveform;

transmit the radio frequency sensing waveform; and transmit a second message separately from and subsequent to the first message, the second message including a second set of parameters including scrambling information associated with the radio frequency sensing waveform.

24. The apparatus of claim 23, wherein the frequency information in the first set of parameters includes a start frequency of the radio frequency sensing waveform and an end frequency of the radio frequency sensing waveform.

25. The apparatus of claim 23, wherein the timing information in the first set of parameters includes a start timing of the radio frequency sensing waveform and an end timing of the radio frequency sensing waveform.

26. The apparatus of claim 23, wherein the radio frequency sensing waveform is a frequency modulated continuous wave signal, and the first set of parameters includes a slope of the frequency modulated continuous wave signal and a repetition time of the frequency modulated continuous wave signal.

27. The apparatus of claim 23, wherein the scrambling information in the second set of parameters includes at least one of an indication for a method of scrambling, a scrambling length parameter, a scrambling ID, an indication of a method of the scrambling ID, an indication of a method for a scrambling sequence, and a comb pattern.

28. The method of claim 12, wherein descrambling the representations of the one or more sensing signals is based on receiving the second message after receiving the one or more sensing signals.

29. The apparatus of claim 11, wherein the at least one processor is configured to descramble the representations of the one or more sensing signals based on the second message being received after the one or more sensing signals.

30. The apparatus of claim 11, wherein the first set of parameters includes a start frequency of the radio frequency sensing waveform and an end frequency of the radio frequency sensing waveform.

31. The apparatus of claim 11, wherein the first set of parameters includes a start timing of the radio frequency sensing waveform and an end timing of the radio frequency sensing waveform.

32. The apparatus of claim 11 wherein the radio frequency sensing waveform is a frequency modulated continuous wave signal, and the first set of parameters includes a slope of the frequency modulated continuous wave signal and a repetition time of the frequency modulated continuous wave signal.

33. The apparatus of claim 11, wherein the second set of parameters includes at least one of an indication for a method of scrambling, a scrambling length parameter, a scrambling ID, an indication of a method of the scrambling ID, an indication of a method for a scrambling sequence, and a comb pattern.

34. The apparatus of claim 23, wherein the at least one processor is configured to transmit the second message subsequent to transmitting the radio frequency sensing waveform.

* * * * *